United States Patent
Pelosi

(10) Patent No.: US 12,242,946 B1
(45) Date of Patent: Mar. 4, 2025

(54) INTEGER GATE LOGIC ARTIFICIAL NEURAL NETWORK

(71) Applicant: Michael J. Pelosi, Clarksville, TX (US)

(72) Inventor: Michael J. Pelosi, Clarksville, TX (US)

(73) Assignee: MLIGLON, Inc., Clarksville, TX (US)

( * ) Notice: Subject to any disclaimer, the term of this patent is extended or adjusted under 35 U.S.C. 154(b) by 0 days.

(21) Appl. No.: 18/776,350

(22) Filed: Jul. 18, 2024

Related U.S. Application Data

(60) Provisional application No. 63/667,022, filed on Jul. 2, 2024.

(51) Int. Cl.
| | |
|---|---|
| *G06N 3/063* | (2023.01) |
| *G06N 3/0442* | (2023.01) |
| *G06N 3/048* | (2023.01) |
| *G06N 3/082* | (2023.01) |

(52) U.S. Cl.
CPC ........... *G06N 3/0442* (2023.01); *G06N 3/048* (2023.01); *G06N 3/063* (2013.01); *G06N 3/082* (2013.01)

(58) Field of Classification Search
CPC ....... G06N 3/0442; G06N 3/063; G06N 3/082
See application file for complete search history.

(56) References Cited

U.S. PATENT DOCUMENTS

| | | | |
|---|---|---|---|
| 10,228,911 B2 | 3/2019 | Henry et al. | |
| 10,540,588 B2 | 1/2020 | Burger et al. | |
| 10,733,794 B2 | 8/2020 | He et al. | |
| 10,867,247 B1 * | 12/2020 | Teig | G06N 3/084 |
| 10,949,736 B2 | 3/2021 | Deisher et al. | |
| 11,010,516 B2 | 5/2021 | Sikka et al. | |
| 11,315,012 B2 | 4/2022 | Anderson et al. | |
| 11,335,387 B2 | 5/2022 | Shan et al. | |
| 11,386,307 B2 | 7/2022 | Batchelor et al. | |
| 11,669,585 B2 | 6/2023 | del Mundo et al. | |
| 12,026,219 B2 | 7/2024 | Storm et al. | |
| 2016/0003481 A1 | 1/2016 | Taniguchi et al. | |
| 2018/0144240 A1 | 5/2018 | Garbin et al. | |

(Continued)

OTHER PUBLICATIONS

Tabaza et al., "Hysteresis Modeling of Impact Dynamics Using Artificial Neural Network," in 37 J. Mechanics 333-38 (2021). (Year: 2021).*

(Continued)

*Primary Examiner* — Ryan C Vaughn
(74) *Attorney, Agent, or Firm* — Hall Estill Law Firm

(57) ABSTRACT

Apparatus and method for implementing an Artificial Neural Network (ANN) section which eliminates the need for backpropagation during training. The ANN section has a plurality of integer gate logic (IGL) nodes respectively arranged into an input layer, an output layer, and at least one hidden layer. Each node has multiple inputs and a single output, and uses a non-differentiable activation function to emulate Boolean logic functions (including XOR), near-Boolean functions, and unknown functions, based on one or more selectable weight values. A chain isolation optimization process is used to select and isolate each node during training to assess the impact of the different weight parameters on the output. Enhanced error functions, batch processing scheduling, and random node selection techniques can be used during training. The nodes can be singly connected, or arranged into convolutional filters or localized fully interconnected layers.

30 Claims, 21 Drawing Sheets

(56) References Cited

U.S. PATENT DOCUMENTS

| | | | |
|---|---|---|---|
| 2019/0114531 | A1 | 4/2019 | Torkamani et al. |
| 2019/0332944 | A1 | 10/2019 | Bai et al. |
| 2019/0378210 | A1 | 12/2019 | Merrill et al. |
| 2020/0097818 | A1 | 3/2020 | Li et al. |
| 2020/0364508 | A1 | 11/2020 | Gurel et al. |
| 2020/0380369 | A1 | 12/2020 | Case et al. |
| 2021/0142177 | A1 | 5/2021 | Mallya et al. |
| 2022/0237452 | A1* | 7/2022 | Marukame ............... G06N 3/08 |
| 2023/0351144 | A1* | 11/2023 | Sudarsanan ............ G06N 3/063 |
| 2024/0087175 | A1* | 3/2024 | Huang ................. G06N 3/0464 |
| 2024/0212328 | A1 | 6/2024 | Loo et al. |

OTHER PUBLICATIONS

Le, Introduction to Micromechanics (2010). (Year: 2010).*
Sneha, The 16 Boolean Logic Functions of Two-Input Systems, https://www.allaboutcircuits.com/technical-articles/16-boolean-logic-functions-of-2-input-system/ (2020). (Year: 2020).*
Li et al., "Urban Flood Mapping with an Active Self-Learning Convolutional Neural Network Based on TerraSAR-X Intensity and Interferometric Coherence," in 152 ISPRS J. Photogrammetry and Remote Sensing 178-91 (2019). (Year: 2019).*
Szegedy, C., et al.; "Going deeper with convolutions" (2014) 12 pages.
Ioffe, S., et al.; "Batch Normalization: Accelerating Deep Network Training by Reducing Internal Covariate Shift"; (2015) 11 pages.
Kingma, D.P., et al.; Adam: A Method for Stochastic Optimization; ICLR Conference (2015) 15 pages.
Wang, G.; "A Novel Neural Network Model Specified for Representing Logical Relations"; (2017) 10 pages.
Yang, J., et al.; "Robustness of classification ability of spiking neural networks"; (2018) 7 pages.
Zhang, G., et al.; "Which Algorithmic Choices Matter at Which Batch Sizes? Insights From a Noisy Quadratic Model"; (2019) 17 pages.
Chen, T., et al.; "A Simple Framework for Contrastive Learning of Visual Representations"; (2020) 20 pages.
Wu, Y., et al.; "Autoformalization with Large Language Models"; (2022) 44 pages.
Wu, Y., et al.; "Memorizing Transformers"; ICLR (2022) 19 pages.
Ahmad, N.; "Correlations Are Ruining Your Gradient Descent"; (2024) 13 pages.
Crulis, B., et al.; "An experimental comparative study of backpropagation and alternatives for training binary neural networks for image classification"; (2024) 17 pages.
Pal, D., et al.; "Modeling Linear and Non-linear Layers: An MILP Approach Towards Finding Differential and Impossible Differential Propagations"; (2024) 42 pages.
Pirillo, A., et al.; "NITRO-D: Native Integer-only Training of Deep Convolutional Neural Networks"; (2024) 15 pages.
Terres-Escudero, E.B., et al.; "On the Robustness of Fully-Spiking Neural Networks in Open-World Scenarios using Forward-Only Learning Algorithms"; (2024) 25 pages.
Triantafyllou, N., et al.; "Deep learning enhanced mixed integer optimization: Learning to reduce model dimensionality"; Department of Chemical Engineering, Imperial College London (2024) 47 pages.
Bland, Richard "Learning XOR: Exploring the Space of a Classic Problem" University of Stirling, Department of Computing Science and Mathematics: Computing Science Technical Report, Jun. 1998 tps://cs.stir.ac.uk/~kit/techreps/pdf/TR148.pdf.
Lee, Dong-Hyun; Zhang, Saizheng; Fischer, Asja; Bengio, Yoshua "Difference Target Propagation" In: Appice, A., Rodrigues, P., Santos Costa, V., Soares, C., Gama, J., Jorge, A. (eds) Machine Learning and Knowledge Discovery in Databases. ECML PKDD 2015. Lecture Notes in Computer Science(), vol. 9284. Springer, Cham. https://doi.org/10.1007/978-3-319-23528-8 31; Dec. 2014. https://arxiv.org/pdf/1412.7525.
Dettmers, Tim "8-Bit Approximations for Parallelism in Deep Learning" International Conference on Learning Representations (ICLR); Nov. 2015. https://arxiv.org/pdf/1511.04561.
Jaderberg, Max; Czarnecki, Wojciech Marian; Osindero, Simon; Vinyals, Oriol; Graves, Alex; Silver, David; Kavukcuoglu, Koray "Decoupled Neural Interfaces Using Synthetic Gradients" Proceedings of the 34th International Conference on Machine Learning, Sydney, Australia,PMLR70, 2017; Jul. 3, 2017 https://arxiv.org/pdf/1608.05343.
Choromanska, Anna; Cowen, Benjamin; Kumaravel, Sadhana; Luss, Ronny; Rigotti, Mattia; Rish, Irina; Kingsbury, Brian; DiAchille, Paolo; Gurev, Viatcheslav; Tejwani, Ravi; and Bouneffouf, Djallel "Beyond Backprop: Online Alternating Minimization with Auxiliary Variables" Proceedings of the 36th International Conference on Machine Learning, PMLR 97:1193-1202; Jun. 2019. https://arxiv.org/pdf/1806.09077.
Ma, Wan-Duo Kurt; Lewis, J.P .; and Kleijn, W. Bastiaan "The HSIC Bottleneck: Deep Learning Without Back-Propagation" The Thirty-Fourth AAAI Conference on Artificial Intelligence (AAAI-20); Aug. 2019. https://arxiv.org/pdf/1908.01580v1.
Xu, Feiyu; Uszkoreit, Hans; Du, Yangzhou; Fan, Wei; Zhao, Dongyan; and Zhu, Jun "Explainable AI: A Brief Survey on History Research Areas, Approaches and Challenges" In: Tang, J., Kan, MY., Zhao, D., Li, S., Zan, H. (eds) Natural Language Processing and Chinese Computing. NLPCC 2019. Lecture Notes in Computer Science, vol. 11839. Springer, Cham. https://doi.org/10.1007/978-3-030-32236-6 51 hi tps://www.researchgate.net/publication/336131051 Explainable_AI_A_Brief_Survey_on_History_Research_Areas_Approaches_and_Challenges.

* cited by examiner

Existing Art

Existing Art

NORMALIZED* GATE LOGIC EMULATION SETTINGS

| GATE TYPE | BIAS (B) | WEIGHT (W1) | WEIGHT (W2) |
|---|---|---|---|
| NULL (ALWAYS OFF) | 0 | 0 | 0 |
| NOR | 1 | -1 | -1 |
| XA | 0 | 1 | -1 |
| XB | 0 | -1 | 1 |
| AND | -1 | 1 | 1 |
| NOTB | 1 | 0 | -1 |
| XOR | 0 | 1 | 1 |
| B | 0 | 0 | 1 |
| NOTA | 1 | -1 | 0 |
| A | 0 | 1 | 0 |
| NXOR | 1 | 1 | 1 |
| NAND | 3 | -2 | -2 |
| OR | -1 | 2 | 2 |
| NXB | 1 | 2 | -2 |
| NXA | 1 | -2 | 2 |
| ALL (ALWAYS ON) | 1 | 0 | 0 |
| WEIGHTED SUM | 0 | 0.5 | 0.5 |

* ALL VALUES ARE MULTIPLIED BY P

NON-DIFFERENTIABLE LINEAR LOGIC OFFSET ACTIVATION FUNCTION

NODE PRUNING SEQUENCE

BATCH LEARNING SCHEDULING

| LAYER | SIZE | TOTAL NODES |
|---|---|---|
| LAYER 1 (INPUT) | 112 X 56 | 6272 |
| LAYER 2 | 56 X 56 | 3136 |
| LAYER 3 | 56 X 28 | 1568 |
| LAYER 4 | 28 X 28 | 784 |
| LAYER 5 | 28 X 14 | 392 |
| LAYER 6 | 14 X 14 | 196 |
| LAYER 7 | 14 X 8 | 112 |
| LAYER 8 | 8 X 8 | 64 |
| LAYER 9 | 8 X 4 | 32 |
| LAYER 10 | 4 X 4 | 16 |
| LAYER 11 | 4 X 2 | 8 |
| LAYER 12 | 2 X 2 | 4 |
| LAYER 13 | 2 X 1 | 2 |
| LAYER 14 | 1 X 1 | 1 |
| | TOTAL NODES | 12,587 |

INTEGER GATE LOGIC ARTIFICIAL NEURAL NETWORK

RELATED APPLICATIONS

The present application makes a claim of domestic priority to U.S. Provisional Patent Application No. 63/667,022 filed Jul. 2, 2024, the contents of which are hereby incorporated by reference.

BACKGROUND

The so-called backpropagation ("backward propagation of errors") algorithm, as utilized for machine learning (ML) in the context of artificial intelligence (AI), has remained largely unchanged in implementation for the past 50 years. Backpropagation is a technique used to train a feedforward Artificial Neural Network (ANN) in which the gradient of an observed loss function (error) with respect to the weights of the network is estimated. The weights are incrementally adjusted in an effort to reduce the observed error.

While a variety of backpropagation techniques have been proposed, most involve the calculation or estimation of partial derivatives using the so-called chain rule via gradient descent beginning at the output and working backwards through the network. The technique operates in a recursive fashion in an attempt to solve for the optimum weights in the system that minimize the loss function.

Backpropagation is computationally complex and requires significant memory, computing, and energy resources, as well as specialized and often expensive hardware (e.g., GPUs, TPUs, supercomputers, etc.) for large models. With the advent of deep learning and other advanced techniques that potentially require billions or more nodes and tens or hundreds of layers or more, backpropagation will likely continue to be a limiting factor in efficient ANN design, training and operation.

SUMMARY

Various embodiments of the present disclosure are generally directed to an apparatus and method for implementing an ANN with Boolean logic gate emulation capabilities and which eliminates the need for backpropagation during training.

Without limitation, some embodiments provide an ANN section having a plurality of integer gate logic (IGL) nodes respectively arranged into an input layer, an output layer, and at least one hidden layer interconnected between the respective input and output layers. Each node in the ANN section is configured to emulate one or more Boolean logic functions responsive to a magnitude of at least one selectable weight value. Each non-output layer node further has a single output connected to a total of one other node in a downstream layer to facilitate training of the nodes using a chain isolation optimization process without backpropagation.

These and other features and advantages of various embodiments can be understood from a review of the following detailed description in conjunction with the accompanying drawings.

DETAILED DISCUSSION

Figure 1:
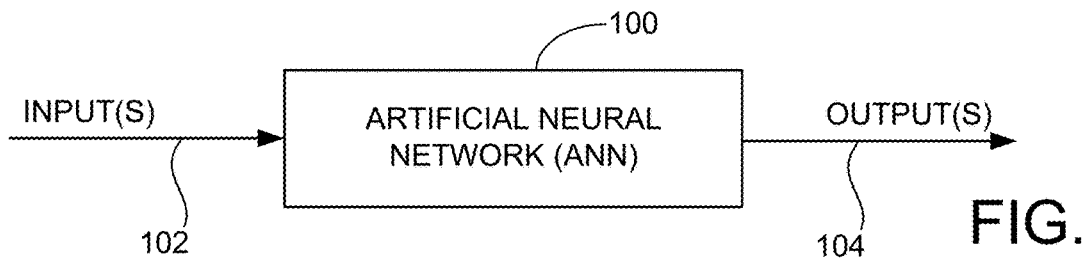
FIG. 1 is a simplified functional block representation of an Artificial Neural Network (ANN) in accordance with the existing art.

Various embodiments of the present disclosure are generally directed to systems and methods for efficiently training a specially configured Artificial Neural Network (ANN) without the need for backpropagation to minimize loss function (error).

As explained below, some embodiments configure the ANN as an array of integer gate logic (IGL) nodes in multiple layers. Each IGL node has multiple inputs, such as two, and a single output which is connected to one, and only one, downstream node in the array. Each node has a number of parameters including weight (W) values for each input, a bias (B) value, and a globally selected constant precision (CP) value.

Each node further has a non-linear activation function. While not necessarily limiting, in at least some cases the non-linear activation function, sometimes referred to herein as a Linear Logic Output (LLO) activation function (AF), is non-differentiable and has one or more local minimum and/or local maximum points apart from the origin.

During processing, a weighted sum (WS) is calculated responsive to the W, B and CP values, and the WS is supplied to the LLO-AF to generate the node output. Because the output is only supplied to one downstream node in the array, a chain isolation optimization technique can be efficiently carried out to adjust the parameters of each node in turn. Generally, the only nodes in the array that will be affected by the parametric adjustments are those nodes in a chain line from the associated output node to the selected node undergoing adjustment. Hence, adjustments can be quickly recalculated for each of the chain line nodes to determine the effect of the new parametric values upon the error term.

Empirical tests carried out to date with standardized test sets (such as the MNIST database) show significant reductions in training time, often by many multiple orders of magnitude, over existing ANN configurations. Because the system can model a variety of difficult to implement Boolean logic gates (e.g., XOR, NAND, NOR, etc.) based on the parametric values, certain difficult to train functions, such as XOR, can be quickly converged with up to 100% accuracy (0% output error). Integer arguments and values eliminate the need for floating point calculations while maintaining substantially any desired level of precision. The boundaries set up for the novel LLO-AFs further ensure that saturation and vanishing/exploding gradients are substantially avoided.

The IGL nodes are suitable for implementation as or with any number of network configurations including fully connected nodes, multi-layer perceptron (MLP) nodes (but with only one connection per node downstream), convolutional neural networks (CNNs), recursive networks (RNNs) including modified LSTM (long/short term memory) neural networks, etc. Moreover, the IGL-ANN can be appended to or inserted into as a separate operational block within the context of a larger more conventional network to provide localized optimization while still permitting operation of the existing network. Any amount of dimensionality can be processed including 1D, 2D, 3D, 4D, up to n-dimensions.

When implemented in software, the system is embarrassingly parallel and can readily be adapted for parallelization at both the network level and the node level. Other techniques are disclosed herein that further promote efficient training including an enhanced error function, intelligent test data pruning, batch learning scheduling, parallel processing, and a network modeling and visualization software tool.

The system has demonstrated the ability to achieve error convergence rates that are significantly improved over existing systems that rely upon backpropagation and other gradient descent based approaches. It is contemplated that the system can accommodate any number of total layers, including hundreds or thousands of layers, while providing an effective, non-backpropagation based training methodology.

In order to describe these and other features and advantages of various embodiments of the present disclosure, it will be helpful to briefly discuss ANNs of the existing art.

Existing Art ANNs

FIG. 1 is a simplified representation of an ANN 100 in accordance with the existing art. As with substantially all ANNs, a series of inputs 102 are supplied, and corresponding outputs 104 are generated in response. To initially configure the system, training data with known outputs are supplied to the ANN during a training (learning) phase, and the system uses backpropagation or similar gradient based techniques to reduce the output error.

The ANN 100 can take any number of suitable forms including as a Multi-Layer Perceptron (MLP) network, a Feedforward Neural Network (FNN), a Convolutional Neural Network (CNN), a Recurrent Neural Network (RNN), a Long Short-Term Memory (LSTM) network, a Radial Basis Function (RBF) network, etc.

Figure 2:
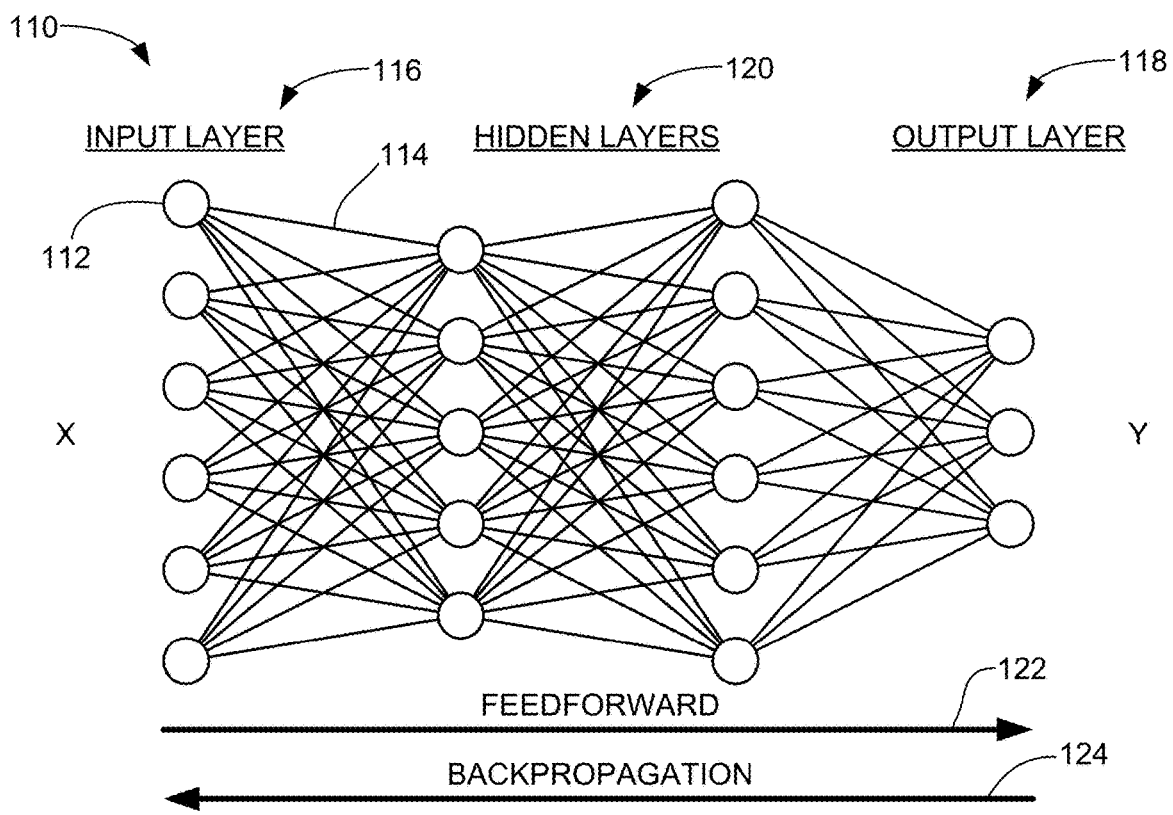
FIG. 2 shows an exemplary interconnection configuration of the ANN of FIG. 1 as a multilayer perceptron (MLP) array in accordance with the existing art.

FIG. 2 shows a representation of an ANN 110 corresponding to the ANN 100 in FIG. 1 with a fully-connected MLP configuration. Other configurations can be used. In FIG. 2, nodes 112 are interconnected via interconnections 114 among a succession of layers. These layers include an input layer 116, an output layer 118 and a number of intermediate (hidden) layers 120 (in this case, two). The respective numbers of layers, and the numbers of nodes in each layer, can vary based on the design constraints, hardware limitations, operational requirements, etc. of the system. As is conventional, the variable X represents the input which is supplied to the various nodes of the input layer 116, and the variable Y represents the output which is supplied to the various nodes of the output layer 118. The number of output nodes will depend on the configuration of the system, and so can be a single node or an array of nodes.

Training ANNs such as the ANN 110 in FIG. 2 usually involves a two step process: first, a feedforward operation takes place, as represented by arrow 122, in which test data (X) are supplied as inputs to the system. Various internal parametric values, such as weights and biases, are initially set to some suitable levels (including random settings) and an initial estimated output value (Y) is generated based on these initial settings.

Second, a backpropagation operation takes place, as represented by arrow 124. The backpropagation operation uses gradient descent to reduce the error by calculating the partial derivatives of each activation function of each node along each path through the network from the output layer 118 to the input layer 116 over a succession of intervals. The weights are adjusted in a direction indicated by the derivatives to minimize the overall error.

As noted above, backpropagation can require significant time and resources, is computationally complex, and has limited effectiveness, particularly for higher level (deep learning) networks. Vanishing gradients, exploding gradients and saturation effects can cause a loss of error reduction effectiveness, further operating as an upper bound on the ability to reduce loss function error.

A particular limitation with backpropagation trained networks is the inability to easily model certain types of input data. For example, the so-called exclusive-OR (XOR) Boolean logic function is known to be particularly difficult to implement in a traditional ANN. As will be recognized, an XOR function operates in accordance with the logic states of Table 1:

TABLE 1

| Input A | Input B | Output |
|---------|---------|--------|
| 0 | 0 | 0 |
| 0 | 1 | 1 |
| 1 | 0 | 1 |
| 1 | 1 | 0 |

In an XOR operation, if either input is high (e.g., logical "1"), then the output is also high. However, if both inputs are high, or low, then the output is low. In a more general sense, XOR provides a "detect if either is present, but not both" operation.

From an ANN standpoint, an XOR function within the network can generally be viewed as attempting to train the network to provide a positive detection if a certain feature is present in the input data stream, unless another feature is also present in the input data stream as well, in which case a negative detection is provided. It is well established in the literature that training a traditional ANN to accurately and reliably implement the equivalent operation of an XOR function is exceedingly difficult. It may be possible in some cases to train a node or a small set of nodes to operate as an XOR, but the global adjustments made during backpropagation make this difficult to establish and maintain in a large network. Other exclusionary Boolean logic functions, such as NAND, NXOR, etc., are difficult to train for similar reasons.

Integer Gate Logic ANNs

Figure 3:
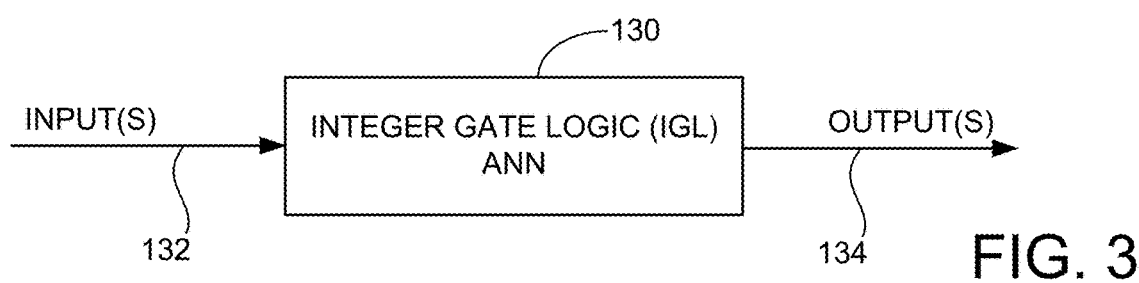
FIG. 3 is a corresponding simplified functional block representation of an Integer Gate Logic (IGL) ANN constructed and operated in accordance with various embodiments of the present disclosure.

FIG. 3 is a functional block representation of a specially configured ANN 130 constructed and operated in accordance with various embodiments of the present disclosure. The ANN 130 is referred to as an Integer Gate Logic ANN, or IGL-ANN, and provides efficient training without the limitations associated with existing backpropagation and other techniques. Indeed, the IGL-ANN eliminates the need for backpropagation entirely in favor of a significantly faster and more robust training approach.

The IGL-ANN 130 otherwise operates in a manner similar to the existing art ANNs 100, 110 described above, and can be configured to carry out substantially any of the above described operations of the conventional ANNs (e.g., classification, pattern detection, content generation, LLM capabilities, etc.). To this end, the IGL-ANN operates to receive input data 132 and generate estimated output data 134 after a suitable non-gradient descent based training operation described below.

Figure 4:
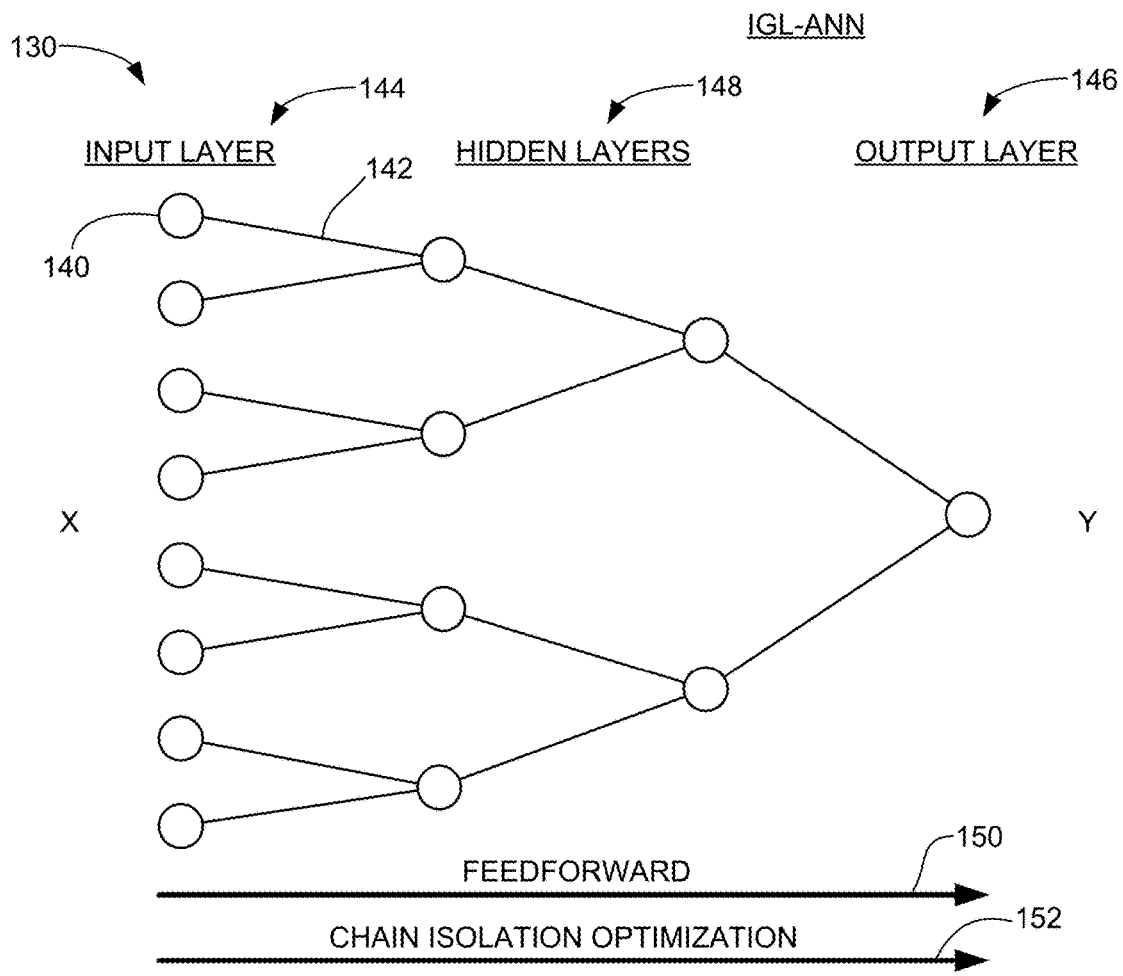
FIG. 4 is an exemplary interconnection configuration of the IGL-ANN of FIG. 3 in accordance with some embodiments.

FIG. 4 is a schematic representation of another IGL-ANN 140 similar to the IGL-ANN 130 of FIG. 3. As with the conventional ANN of FIG. 2, the IGL-ANN 130 is formed as an array of nodes 140 (referred to herein as IGL nodes) with associated interconnections 142. The nodes 140 are arranged into multiple layers, including an input layer 144, an output layer 146 and multiple (in this case, two) hidden layers 148.

Initially, it will be noted that each node 140 is connected to a single downstream node, and each node, apart from the input layer nodes in layer 144, has a total of two inputs. This is a particularly useful configuration, but other arrangements are contemplated as discussed below. While the network converges to a single output node (Y), other output layer configurations can be used so that any number of output nodes can be provided in the output layer. Nevertheless, because each node is shown to be connected to only one downstream node, the network tends to converge rapidly.

Arrow 150 depicts a feedforward operation in which input (X) data are input to the input layer 144, and estimated output (Y) data are generated in the output layer 146 based on various parametric values of the nodes 140. Arrow 152 depicts a follow up chain isolation optimization operation, in which error in the resulting output is minimized. Prior to describing the chain isolation optimization, however, it will be helpful to provide additional details regarding the individual nodes 140.

Figure 5:
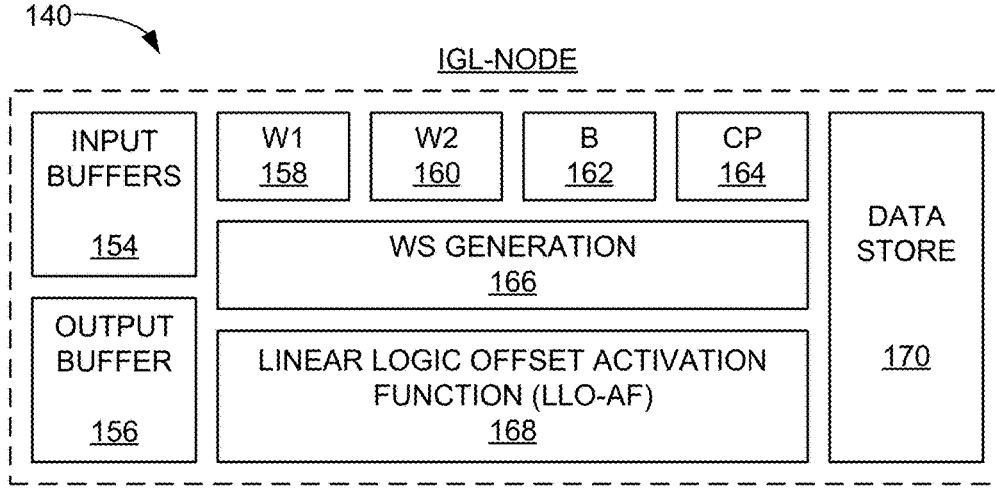
FIG. 5 is a functional block representation of each IGL node in the IGL-ANN of FIGS. 3 and 4 in some embodiments.

To this end, FIG. 5 is a graphical representation of a selected IGL node 140 from FIG. 4 in some embodiments. The node 140 can be realized in hardware (e.g., gate logic and other hardware components), in software, in firmware, or a combination of the same. From an operational standpoint, the exemplary node 140 includes a set of input buffers 154 to receive the input values from the upstream nodes in the array (or, a single value if the node is in the input layer). In this example, the node 140 receives a total of two inputs, referred to herein as X1 and X2, and these values are temporarily stored in the buffer 154.

An output buffer 156 similarly stores the output value, denoted herein as Y1 or simply Y (for selected node N=1), for transmission downstream to the next node in the array.

Various parameters utilized by the node 140 include a first weight (W1) 158, a second weight (W2) 160, a bias (B) 162, and a global precision (granularity) value referred to as CP 164 (constant precision). It is contemplated that the CP value (and its inverse P) are globally set and applied to all nodes in the array equally, as explained more fully below. It will be appreciated that the various values in blocks 158-164 are set as needed based on the configuration of the node (e.g., hardware, software, etc.).

A weighted sum (WS) is generated by block 166 based on the inputs X1, X2 and the parameters W1, W2, B and CP. A linear logic offset activation function (LLO-AF) block 168 provides a non-linear transformation of the WS to generate the output value Y1 as explained below. A data store 170 comprises local or accessible global memory for previous values and other control information used during the operation of the node 140.

Figure 6:
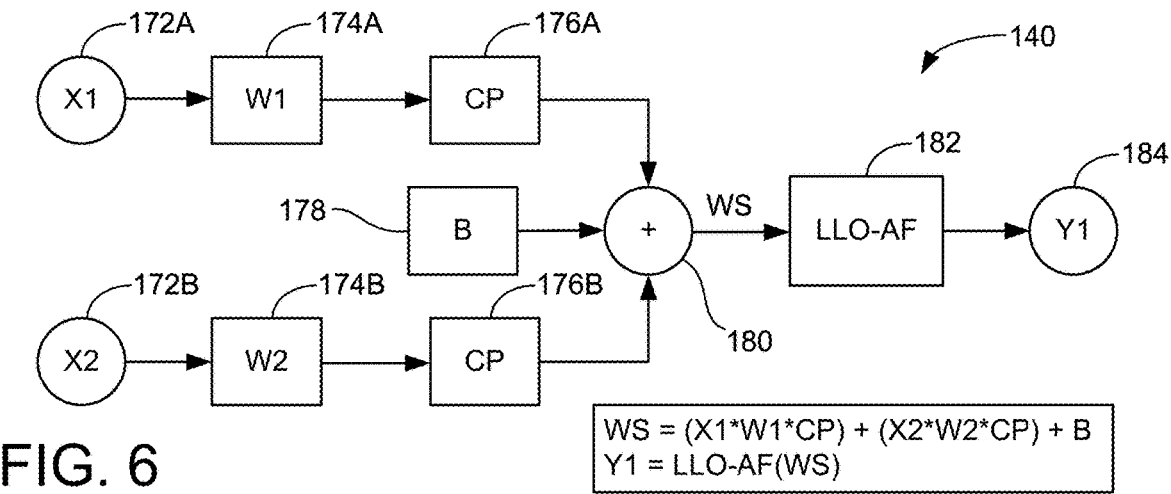
FIG. 6 is a logic diagram representation of the IGL node of FIG. 5 in some embodiments.

FIG. 6 provides a schematic representation of the node 140 from FIG. 5. The weighted sum value WS may be given by:

$$WS=(X1*W1*CP)+(X2*W2*CP)+B \quad (1)$$

Which is output by summing block 180 based on the operation of register blocks 172A/172B and scalar blocks 174A/174B and 176A/176B. The bias (B) is supplied by scalar block 178; in alternative arrangements, a base input value (such as a normalized logical 1) is multiplied by a biasing weight (BW) to apply the desired bias value B.

The output WS is next applied to the LLO-AF as shown by block 182 to generate the output Y1, as:

$$Y1=LLO-AF(WS) \quad (2)$$

where Y1 is a function of WS. The function LLO-AF of block 182 is graphically represented by curve 200 in FIG. 7. Other activation function configurations can be used so that the curve 200 is merely exemplary and is not limiting. The curve 200 is formed of discrete segments 200A, 200B, 200C, 200D and 200E which are plotted against a horizontal axis 202 and a vertical axis 204 with normalized values P.

It will be noted that the curve 200 is non-differentiable due to the localized minimum at 2P on the horizontal axis 202 providing a discontinuous gradient effect (e.g., the gradient decreases from 3P to 2P, but increases from 2P to P, etc.). While it is contemplated that a differentiable curve may be alternatively used with a more continuous gradient, such is unnecessary, and in some cases may be detrimental to the efficient convergence of the system.

As noted above, the node 140 performs the various calculations shown in FIG. 6 and equations (1) and (2) using integer based calculations; that is, no floating point decimal calculations are needed or desired in at least most embodiments. Besides simplifying the complexity of the calculations by eliminating the additional overhead and circuit complexity of supporting floating point (decimal) calculations, the use of integer based calculations, as normalized by the use of the value P, also serves to advantageously reduce or eliminate the problems of vanishing gradient and saturation effects. Having said that, the system can be operated efficiently with the use of floating point calculations, and such implementations are contemplated as being within the scope of this disclosure as well.

To accommodate these integer math calculations, the value P represents the precision of the system. The precision P is a selectable value to accommodate the desired granularity in the data while maintaining the use of integer math. The value CP, which was introduced above in FIGS. 5-6, is more particularly a precision multiplier constant, or the inverse of P (e.g., CP=1/P). Stated another way, P can be viewed as representing the total number of incremental values that are available between the rail values of 0 and P, and CP represents the corresponding amount of distance from one increment to the next over this range.

Table 2 shows various example values for P and CP based on orders of 10:

TABLE 2

| Precision (P) | Increment (CP = 1/P) |
| --- | --- |
| 100 | 0.01 |
| 1000 | 0.001 |
| 10,000 | 0.0001 |
| 1,000,000 | 0.000001 |
| 10,000,000 | 0.0000001 |
| ... | ... |

While orders of 10 are shown, other orders of magnitude can be selected as desired. In some cases, using P values that are orders of 2 (e.g., 4096, 32,768, etc.) as the precision levels may be useful in expediting calculations.

Returning to FIG. 7, it can now be seen that for a given P value (for example, P=1,000,000), then there are 1,000,000 points or levels between 0 and P for segments 200A, 200B and 200C in curve 200. The corresponding CP (increment) value is 0.000001 along these segments. Other values of P will provide different resolution levels. Without limitation, in some embodiments 32 bit integer values are used, although other sizes may be appropriate for a given implementation.

Table 3 shows the application of the activation function LLO-AF by block 182 in FIG. 6 to the weighted sum WS values obtained from block 180 in FIG. 6. The function is applied in the form of a series of five (5) conditional statements corresponding to the five segments 200A through 200E:

TABLE 3

| WS Value: | Output Y1 Value: |
| --- | --- |
| (1) If WS < 0 | 0 |
| (2) If WS is between 0 to P | WS |
| (3) If WS is between P and 2P | P − (WS − P) |
| (4) If WS is between 2P and 3P | WS − 2P |
| (5) If WS > 3P | P |

The adjoining nature of the various segments 200A through 200E means that the boundary conditions are continuously resolved (e.g., if WS is exactly equal to P, then Y1=WS regardless whether condition (2) or condition (3) is applied). It does not matter what the absolute magnitude of P is selected to be: whether P=100 or P=10,000,000,000, the above logic from Table 3 will provide efficient application of the LLO activation function LLO-AF.

Figure 7:
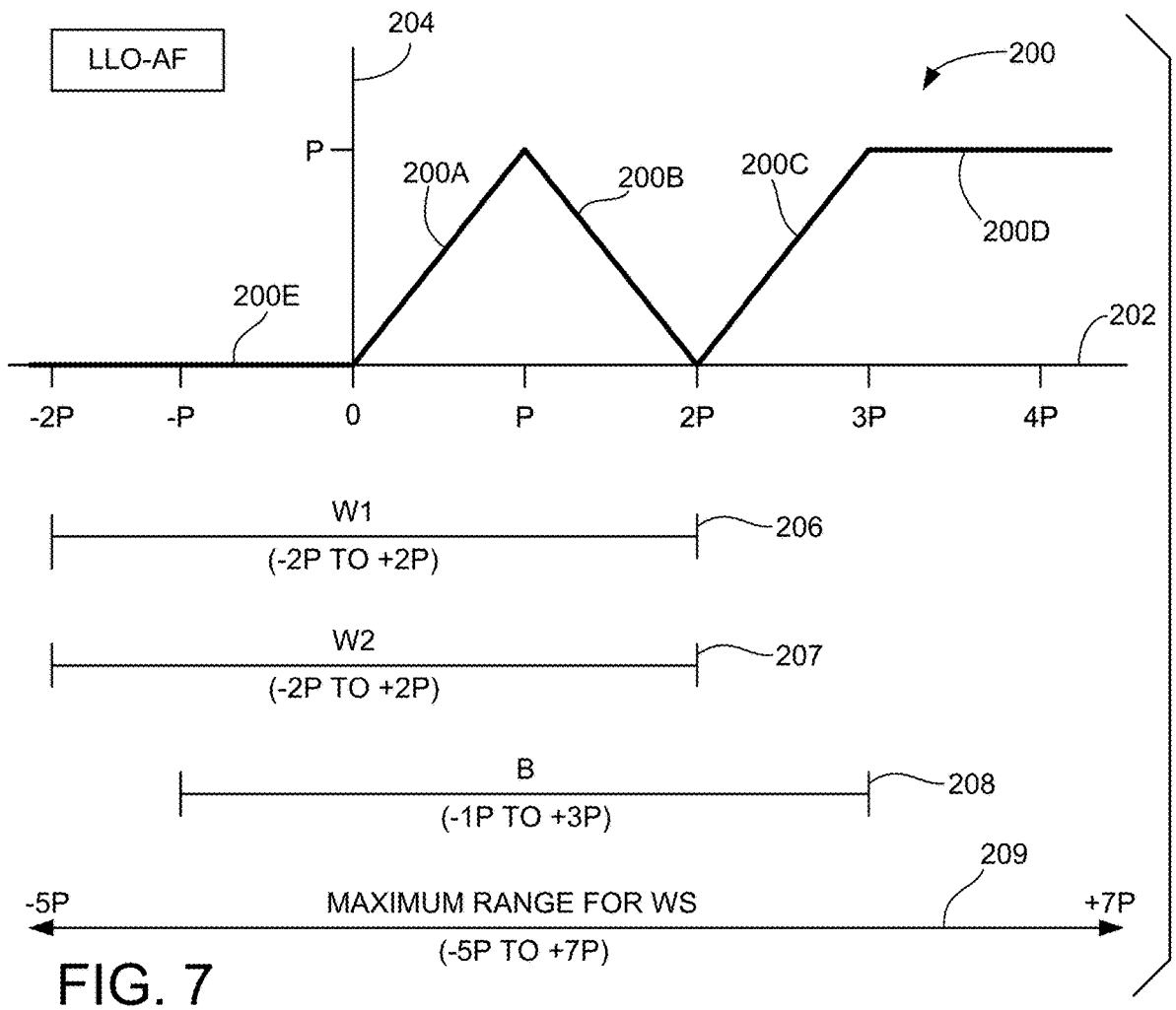
FIG. 7 is a graphical representation of a linear logic output (LLO) activation function of FIG. 6 in some embodiments.

The ranges for the weights W1 and W2, the bias B, and the weighted sum WS are graphically represented in FIG. 7 by ranges 206, 207, 208 and 209 which extend along the horizontal axis 202. The minimum (Min) and maximum (Max) values for W1, W2, B and WS, and the corresponding output value Y1, are also listed in Table 4:

TABLE 4

| Parameter | Minimum Value | Maximum Value |
| --- | --- | --- |
| W1 | −2P | +2P |
| W2 | −2P | +2P |
| B | −P | +3P |
| WS | −5P | +7P |
| Y1 (Output) | 0 | P |

The magnitude of the output Y1 corresponds to the height of the function along the horizontal axis 204, and hence, will be bounded by 0 to P as dictated by the value of WS. The maximum output of each node will thus be restricted to a positive integer value between 0 and P, inclusive.

The LLO activation function as disclosed herein is a novel application that allows a single node to model all 2-input 1-output digital Boolean logic functions, as well as multitudes (e.g., thousands, millions, more) of interpolated functions, based on the selected precision (P) and selected parameters (B, W1, W2). This functionality includes the ability to model particularly difficult Boolean functions, including but not limited to XOR, NOR, NAND, etc. The parameter settings for (B, W1, W2) to implement 16 standard Boolean functions, as well as NULL and ALL functions, are provided by a gate logic configuration table in FIG. 7A. For simplicity of illustration, the values in the table are normalized; that is, during implementation, each parameter value (B, W1, W2) is multiplied by the precision value P. As can be seen from the respective bias and weight values in the table, the functions labeled as NXA, NXB correspond to Boolean implication functions, and the functions labeled as XA, XB correspond to Boolean inhibition functions.

Figures 7A, 8A:
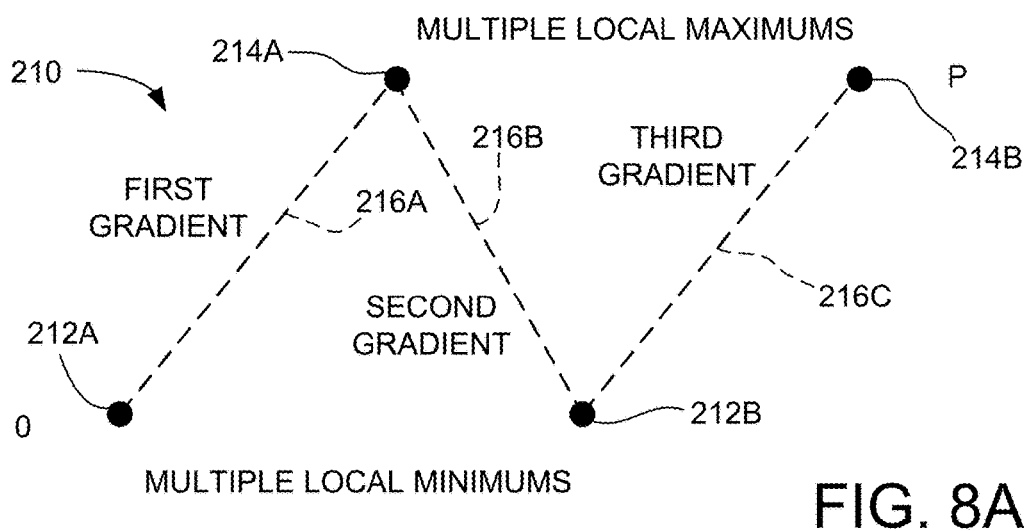
FIG. 7A is a table of normalized gate logic emulation settings that can be implemented by the node of FIG. 5 in some embodiments.
FIGS. 8A, 8B and 8C graphically depict alternative non-differentiable LLO activation functions that can be utilized in accordance with further embodiments.

From the table in FIG. 7A, a particular node may be configured as an XOR functional node using nominal parameter settings of (0, 1P, 1P). If P is set equal to 1,000,000 (1M), then the implemented values are (0, 1M, 1M). A NAND functional node may be set using (3P, −2P, —2P), and so on. As noted above, it has been found exceedingly difficult in many existing ANN configurations that use backpropagation training techniques to be able to accurately implement such functions across the network.

The nodes can further be configured as "near-Boolean" nodes. For example, a particular node may be made a "near-XOR" node with values that are close to (0, 1P, 1P), such as settings of (0.01(P), 0.9946(P), 1.10827(P))=(10, 000, 994,600, 1,108,270) where P=1M. A near-XOR node with these settings (or similar settings) would largely operate to provide an XOR response to the input values, but with precisely tuned behavior not present in a straight XOR node configuration with parameters (0, 1M, 1M). As such, the nodes may be viewed as having analog gate logic capabilities, which significantly enhances the training capabilities of the network.

Among the various configurations shown in FIG. 7A, a basic weighted sum mode can be used with settings for (B, W1, W2) of (0, 0.5P, 0.5P). This enables the node to substantially behave like a traditional ANN node in addition to these other logic gate capabilities. Of course, a number of other, non-logic gate configurations are available as well over the full range of the various parameters as shown in FIG. 7 and Table 3, such as (2.5P, 1.7P, −1.4P), etc. Nodes with these and other parametric configurations are sometimes referred to herein as having an unknown function.

The ability to accommodate and model this full range of Boolean functions, as well as near-Boolean functions and unknown functions, is facilitated by the use of a non-differentiable linear logic offset activation function (ND-LLO-AF). As used herein, the term "non-differentiable" is not used in a classic mathematical sense, but rather, in a back propagation sense to mean that the ND-LLO-AF does not provide a single gradient that descends to the origin, as with existing functions (e.g., ReLu, Softmax, etc.). Instead, non-differentiable as used herein refers to the function having more than one localized minimum and/or localized maximum point.

FIG. 8A is a schematic depiction of aspects of a generalized ND-LLO-AF 210 that can be used in conjunction with various embodiments. The function 210 is similar to the function 200 discussed above in FIG. 7, and includes multiple local minimums 212A and 212B, multiple local maximums 214A and 214B, and first, second and third gradient segments 216A, 216B and 216C.

The minimums 212A and 212B can correspond to the junctions between segments 200A/200E and 200C/200D in FIG. 7, or can have other values. It is contemplated albeit not necessarily required that the minimums 212A/212B will have values equal to or close to zero (0). Similarly, the maximums 214A and 214B can correspond to the junctions between segments 200A/200B and 200C/200D in FIG. 7, and will have values equal to or close to P. The various gradients 216A, 216B and 216C can correspond to the segments 200A/200B/200C, although these can take other shapes as well including curvilinearly extending, segmented, etc. While only two minimums and only two maximums are shown, other numbers can be used.

As noted previously with respect to the discussion of FIG. 7, the local minimum 212B is bounded by two local maximums (e.g., 214A/214B) so that the gradient along curve 210 decreases when approaching point 212B and increases when moving away from point 21B in both directions. The same is true for local maximum 214A, where the gradient increases toward this point and decreases when moving away from this point. This provides a localized trough or hill within the overall function profile. As will be appreciated, such features are undesirable or unusable when implementing conventional backpropagation, since movement in a given direction along the horizontal axis provides both increases and decreases in gradient. Using this definition, it will be understood that the LLO-AF 200 in FIG. 7 is also fairly characterized as an ND-LLO-AF.

Figure 8B:
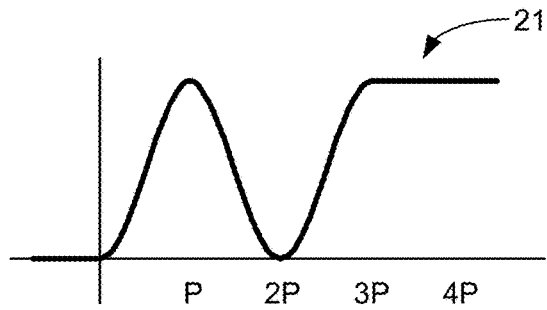
Figure 8C:
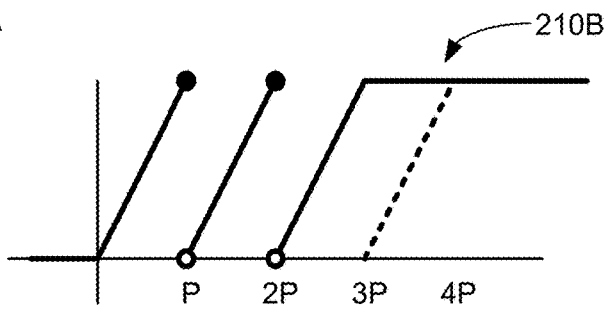

FIG. 8B provides a graphical representation of another ND-LLO-AF activation function 210A with a sinusoidal waveform based on y=sin (x). FIG. 8C shows another LLO activation function 210B with a sawtooth waveform based on parallel discontinuous segments all having the same slope. It will be noted that reversing the order of condition (3) in Table 3 provides the associated sawtooth shape in FIG. 8B.

FIG. 8C further shows that, while some embodiments truncate the LLO activation function at +3P, additional cycles can be provided as desired (e.g., +4P, +5P, etc.). Any number of other LLO activation functions may be used as desired with networks configured as described herein.

Chain Isolation Optimization

As stated previously, backpropagation is unnecessary and can be eliminated during the IGL-ANN training process. This is because, except as noted below, the output of each node in the IGL-ANN passes as a primary input to a single downstream node rather than to multiple downstream nodes in parallel. Stated another way, a single unique path, rather than multiple parallel paths, can be traced through a network section from the output node/layer to each input and/or hidden node within a given network section. This is explained more fully in FIG. 9.

Figure 9:
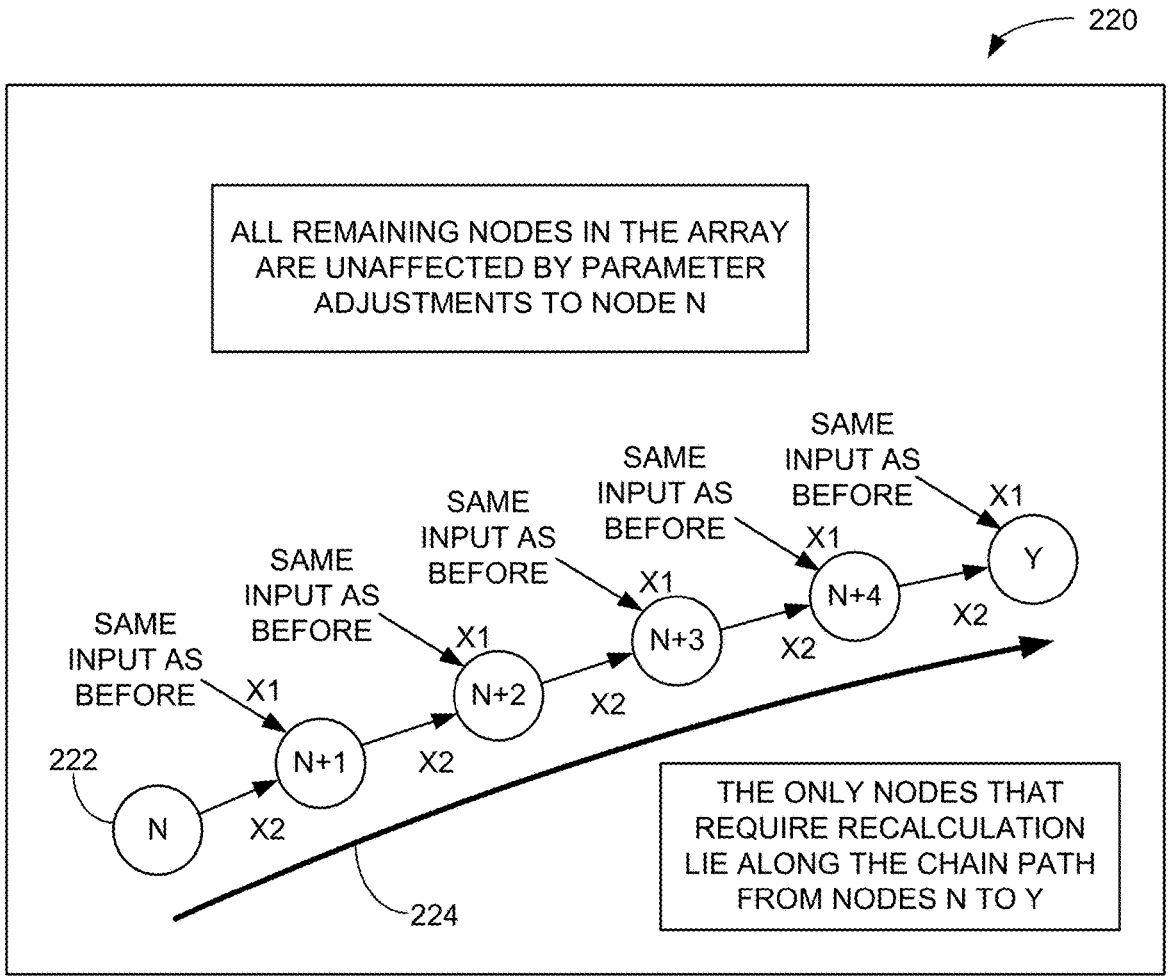
FIG. 9 schematically represents aspects of a training operation used to train the IGL-ANN in accordance with some embodiments.

FIG. 9 is a schematic representation of another IGL-ANN 220 having a population of nodes 222 arranged as described above. For a selected node N within the array 220, a single active chain path 224 extends from node N to the output node Y. The active chain path 224 for node N is a pathway along which the output from node N passes successively to, and is acted upon, nodes N+1, N+2, N+3 and N+4 before reaching terminal node Y. This is the only active feedforward path between nodes N and Y. This condition is true for each of the remaining input and hidden nodes in the network section 220.

It will be appreciated that the impact that the output of node N decreases at each successive layer (e.g., the output of node N accounts for 50% of the input at node N+1, 25% at node N+2, 12.5% at node N+3 and so on), but the output of node N nevertheless is actively passed through and influences this chain of nodes, and only this chain of nodes, to the output node Y.

It follows that, if the parametric values for node N (e.g., B, W1, W2) are adjusted for a given input X to the array 220, the only nodes that will be affected are the downstream nodes N+1 through N+4 along path 224 that are connected to receive the output of node N. All remaining nodes in the array will remain (nominally) unaffected by the adjustments to the parameters of node N and will (nominally) output the same values as before for the same input training data.

This is a key point to understanding the chain isolation optimization carried out in accordance with at least some embodiments. Values generated by the various nodes in the array can be stored and reused without the need to recalculate these values.

Instead, all that is needed to test to see if a particular parametric adjustment to node N in FIG. 9 has desirably reduced (or alternatively, undesirably increased) the loss function at output node Y is to make the adjustment to node N, generate a new output value (Y1 for node N), and propagate the updated output from node N forward along chain path 224 to each of the downstream nodes N+1 through N+4 to obtain a new, updated array output value Y.

Figure 10:
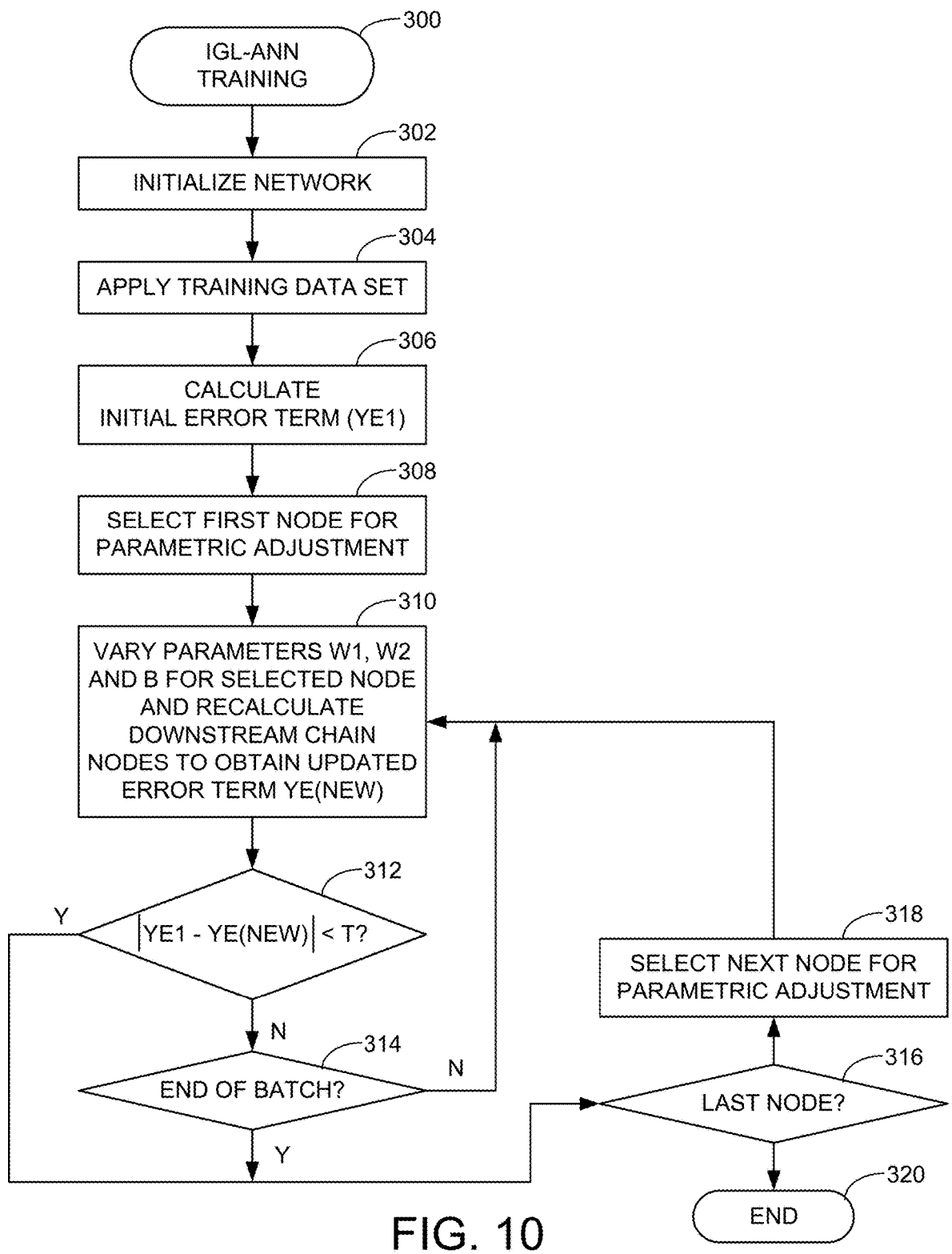
FIG. 10 is a flow chart for an IGL-ANN training routine illustrative of steps that may be carried out in accordance with some embodiments.

Accordingly, FIG. 10 provides a flow chart for an IGL-ANN training routine 300 illustrative of steps carried out in accordance with the foregoing discussion. It will be appreciated that the routine 300 is merely exemplary and is not limiting, so that variations are contemplated and can readily be implemented including the omission, addition, modification and resequencing of various steps, etc.

For purposes of the present example it will be contemplated that the following discussion of FIG. 10 will contemplate the training of a selected IGL-ANN such as the exemplary array 130 in FIG. 4 or the exemplary array 220 in FIG. 9. As part of this chain isolation optimization sequence, a succession of training data sets will be presented which include input X data sets along with corresponding correct output Y values. A succession of the training data sets will be used, including in subsequent selected batches as explained below.

The array network is initialized at step 302. This can include a number of operations including selection of the number of nodes and layers in the system, and the setting of various initial values to the data. A desired precision P is also selected at this time appropriate to the resolution of the training data sets and other factors. The parameters may be randomized (e.g., random weights and bias values may be assigned through the network), or predetermined values (e.g., 0.5 for every value, etc.) may be used. Ultimately, it has been found that the rate of convergence will be sufficiently accelerated that while random values tend to work well, any values, including rail values (e.g., weights of −2P, etc.) will also work well as initial values.

A training data set is next applied to the network at step 304. After a statistically sufficient number of runs, an initial error term (loss function) is calculated at step 306. This initial error term, sometimes referred to herein as YE1, is determined in relation to the difference between the expected (desired) output Y and the observed (actual) output Y for each separate batch or combination, in total. As such, the calculation of the initial observed error YE1 can be the same as other loss function calculations on conventional ANNs, or may be a specially configured loss function as described below in a following section. It is contemplated that, however expressed, the YE1 value will usually have a non-zero magnitude; that is, at least some error will exist in the system between the true outputs and the estimated outputs.

At this point, the routine transitions to chain isolation optimization at step 308 by selecting a first node from the network for evaluation and parametric adjustment. In some embodiments, all of the non-input layer nodes in the system are selected in turn for evaluation, so one node may be as good as the next one for this initial selection. A random selection mechanism can be used for these node selections, or a step-wise ordered selection pattern can be used, informed by previous passes through the system. It is contemplated that, in situations where an ultimate threshold level of error is acceptable, nodes will continue to be evaluated and adjusted until this ultimate threshold level is met.

The routine continues at step 310 where the selected node (in this case, node N in FIG. 9), undergoes repetitive variation of the respective parameters W1, W2 and/or B from an initial value to an updated value while presenting a subset of the test data sets to the system.

One way to provide different variations of the parameters is to provide a limited number of combinations of these parametric values, such as 35-40 combinations, against each of a selected number (batch) of randomly selected test data combinations. For example, for a given first test combination (e.g., input X and actual output Y), each of the various logic gate combinations of FIG. 7 can be applied to determine an associated output Y1 value from the node N. Other combinations can include intermediate values (e.g., various other settings for W1. W2 and B such as 0.3, 0.75, −1.4, +1.8, etc.), randomly selected values, and so on.

By repetitively presenting a fixed X input to the system, the values of other nodes can be recorded in memory, so that it is not necessarily required to pass the full data set through the system each time. Rather, with reference again to FIG. 9, each time a new combination of parametric values (B, W1, W2) are updated to node N, each of the X2 inputs along the chain path 224 will need to be updated, but the rest of the array 220 remains unaffected and the X1 values remain consistently the same independently of what parametric changes are made to node N.

It follows that a smaller batch of records can be used to cycle through each set of parameters and the error rate can be evaluated quickly to identify first the correct direction, and secondly, the correct magnitudes of the respective parameters that provide reductions in the error. These steps are represented by steps 312, 314, 316 and 318 in FIG. 10. Other processing sequencing can be used.

In one non-limiting example, if 2000 combinations (test points of X, Y) are randomly selected, and 35 different combinations of parameters are selected for testing against these 2000 combinations, then a complete first pass evaluation of the node can take place with roughly 70,000 integer math calculations for node N. If the X1 input values are captured for each combination, then an updated YE (new) value can be calculated quickly by feeding forward the newly generated outputs from node N to the downstream nodes N+1 through Y. As a result, testing and optimization of each selected node may only require a relatively short period of time, such as a matter of seconds or less, with optimized levels retained.

The process thus continues on with the selection of a new node, such as randomly, and the process is repeated. An initial smaller batch of test point combinations, such as 20 out of a larger batch of 2000, can be used to initially test and identify promising combinations, which can then be further confirmed by running the rest of the batch. At such time that the error has been sufficiently reduced, the system can exit the optimization routine as shown at step 320. Additional chain isolation optimization techniques are described in further sections below.

Network Implementation Alternatives

Figure 11:
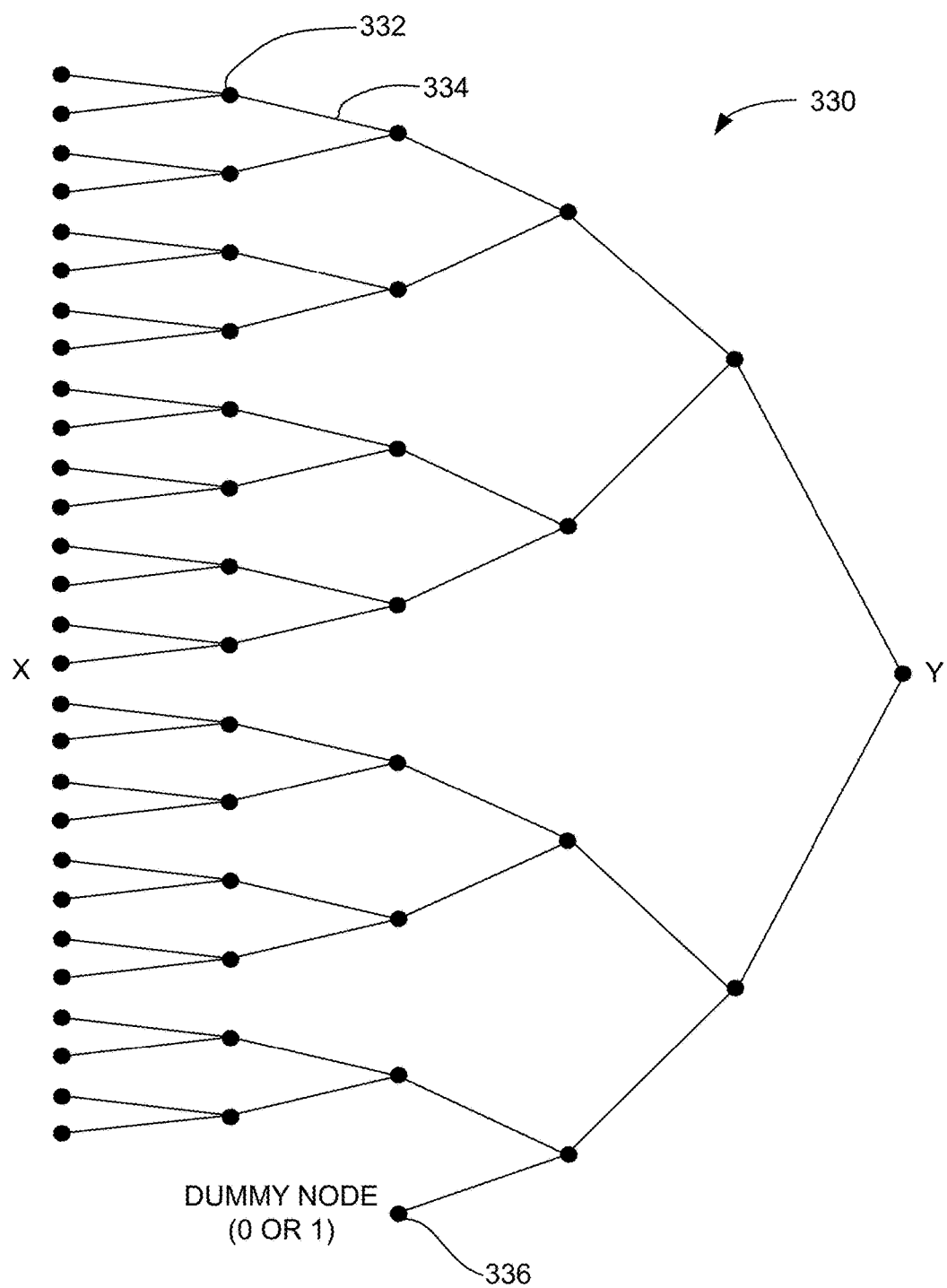
FIG. 11 shows another exemplary IGL-ANN network in accordance with further embodiments.

FIG. 11 shows another simplified IGL-ANN array 330 constructed and operated in accordance with various embodiments. The array 330 is arranged of 2-input 1-output IGL nodes 332 with interconnections 334 as shown. In this simplified example, the network has six (6) layers and a total node count of 57 nodes.

FIG. 11 is useful in that it points out a result of using 2-input, 1-output nodes; the total number of input nodes may or may not be a power of 2. As such, during subsequent combining operations that take place with higher level layers, a layer may reduce to an odd number (such as layer 3 with 7 active nodes). In this case, a dummy node such as 336 can be used to supply the second input, with the dummy node always supplying a constant value such as a (normalized) 0 or 1 level input to the downstream node. Other dummy nodes can be used as required throughout a given ANN.

Figure 12A:
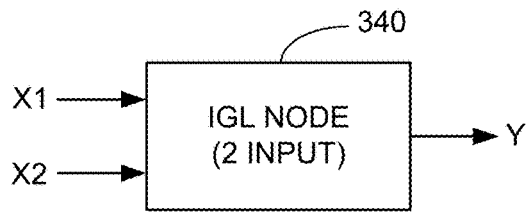
FIGS. 12A and 12B show different configurations for IGL nodes in further embodiments.
Figure 12B:
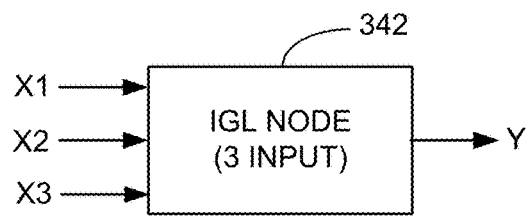

FIGS. 12A and 12B illustrate different node configurations for the IGL nodes in accordance with further embodiments. A node 340 in FIG. 12A has two inputs (X1, X2) and one output (Y1). Node 342 in FIG. 12B has three inputs (X1, X2, X3) and one output (Y2). Since there are numerous logic gate configurations with more than just two inputs, these figures illustrate that any number of inputs can be provided to each node and have the node still operate as a Boolean logic gate with the appropriate parametric values. It is contemplated that the 3-input node 342 would have parameters of (B, W1, W2, W3) with the weights W1-W3 applied to the respective inputs X1-X3 as part of the WS calculation (see FIG. 6).

Figure 13A:
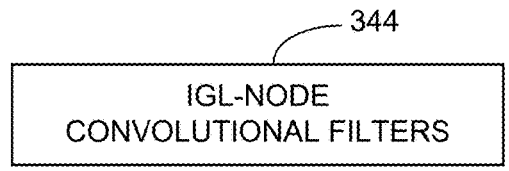
FIGS. 13A and 13B depict convolutional filter sections that can be constructed as a part of an IGL-ANN using the nodes from FIGS. 12A and/or 12B in further embodiments.

The examples described thus far have connected all of the nodes in an upstream layer to the nodes in a downstream layer. This is merely exemplary and not limiting, as other combinations are contemplated including arrangement of the IGL nodes as convolution filters 344, as generally represented in FIG. 13A.

As will be recognized, a convolution filter is a small subset of a larger network that covers or traverses the input data to detect a multi-pixel feature. The filter may be realized as a smaller array of M×N nodes (e.g., 3×3, 10×10, 1×4, etc.) which cooperate as a unit to scan different portions of the larger input data set.

Figure 13B:
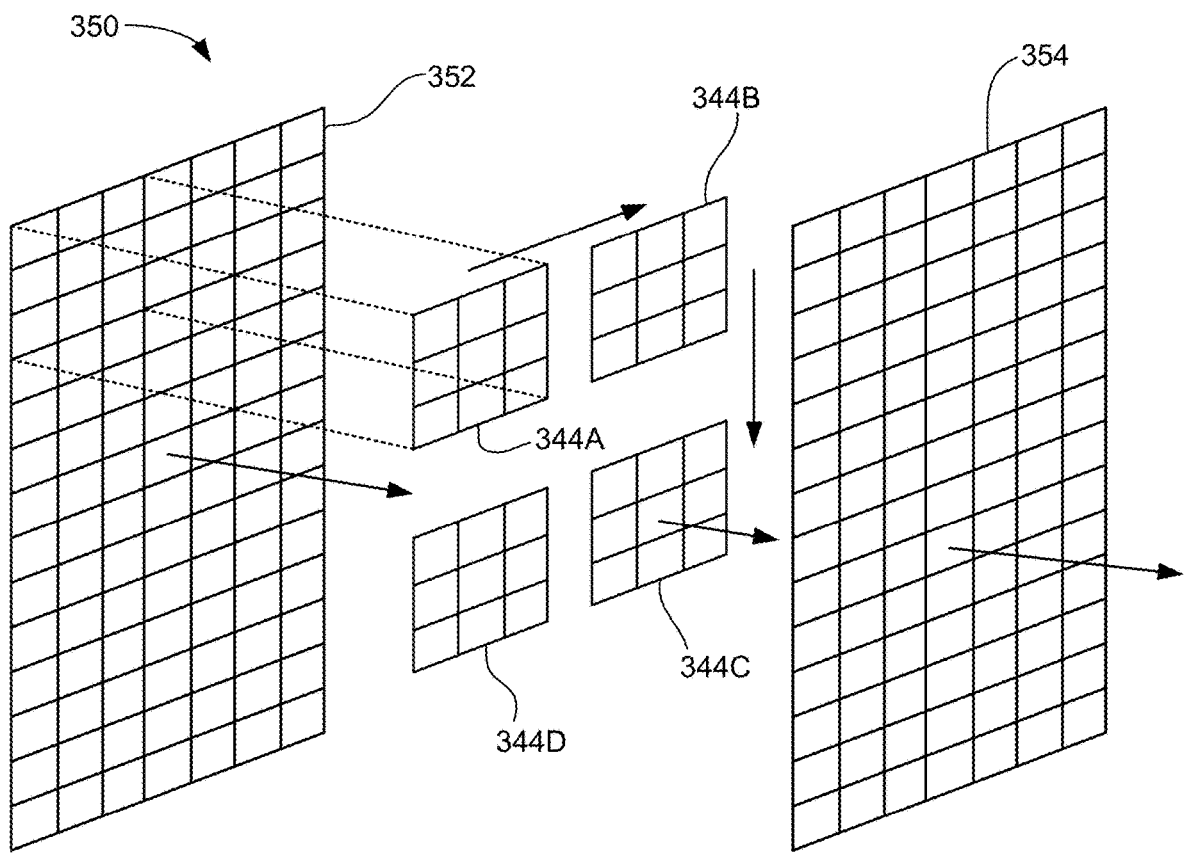

FIG. 13B shows an IGL-ANN network 350 with input data 352 scanned by one or more convolution filters 344A, 344B, 344C, 344D. These filters may represent a single "block" of filter nodes that traverse the input data 352 (such as left to right and up to down), or may be separate filters that examine different zones or portions of the input data in parallel (such as corners, sides, middle, etc.).

The outputs from the filters 344A-344D are provided to a downstream pooling layer 354 which receives various grouped output values from the filters 344A-344D (e.g., Max, Min, Avg., etc.) and provides these to a downstream layer (not shown) for further processing. For example, the maximum (Max) output value from the nodes making up filter 344A may be forwarded from the filter to the next layer, and so on. The IGL nodes disclosed herein are particularly suitable for convolutional applications such as set forth in FIGS. 13A-13B.

The IGL-ANN systems presented herein can further be adapted to process multi-dimensional data. FIGS. 14A-14E show different alternative interconnection configurations that can be utilized for single dimension (1D), 2D, 3D and 4D input data. Other dimensional data, including up to 100D or more, can be similarly processed as required.

Figure 14A:
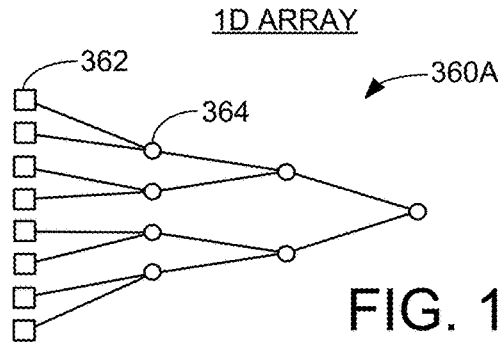
FIGS. 14A through 14E show different array configurations to process multi-dimensional input data in further embodiments.

FIG. 14A shows a 1D array 360A with input nodes 362 and downstream nodes 364. These interconnections are similar to those described above. It will be appreciated that multi-dimensional data can be "flattened" into a single stream of characters and processed by a 1D array (e.g., the 28×28 MNIST data sets can be flattened to a 784×1 array and processed in this fashion).

Figure 14B:
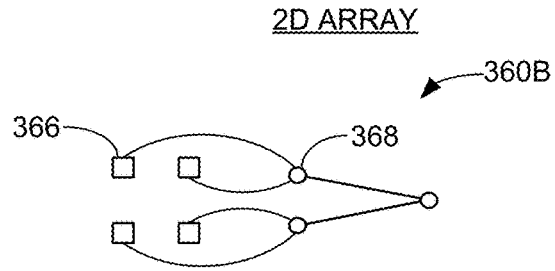

FIG. 14B shows a simple 2D array 360B with a 2×2 array of input nodes 366 and various downstream nodes 368. The top two input nodes are fed to a first downstream node, and the bottom two input nodes are fed to a second downstream node. Other arrangements can be used.

Figure 14C:
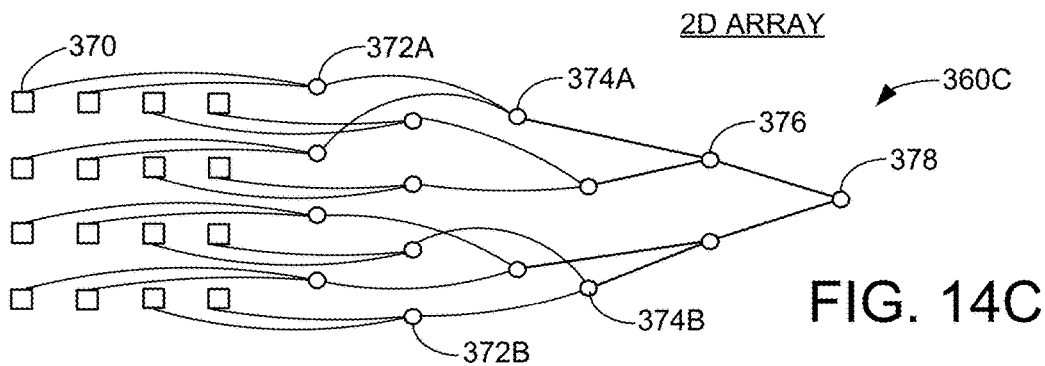

FIG. 14C shows another 2D array 360C with a 4×4 array of input nodes 370. In this case, nodes 372A/372B process respective pairs of the input nodes 370, and so on with nodes 374A/374B, 376 and 378.

Figure 14D:
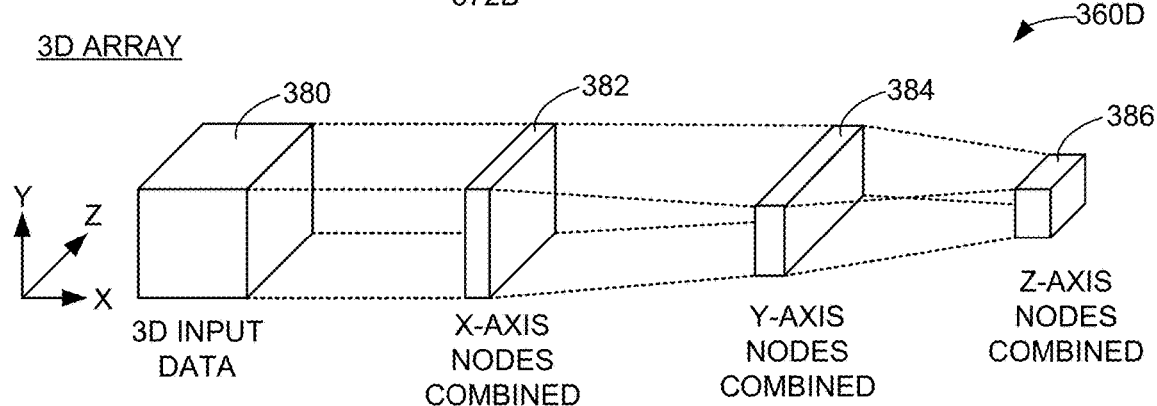

FIG. 14D generally represents a 3D array 360D with 3D input data 380, such as imaging or modeling data, expressed in three dimensions (axes X, Y, Z). In this embodiment, layer 382 processes nodes combined along the X-axis, layer 384 processes nodes combined along the Y-axis, and layer 386 processes nodes combined along the Z-axis 386. Further processing layers (not shown) can combine (flatten) these results as needed.

Figure 14E:
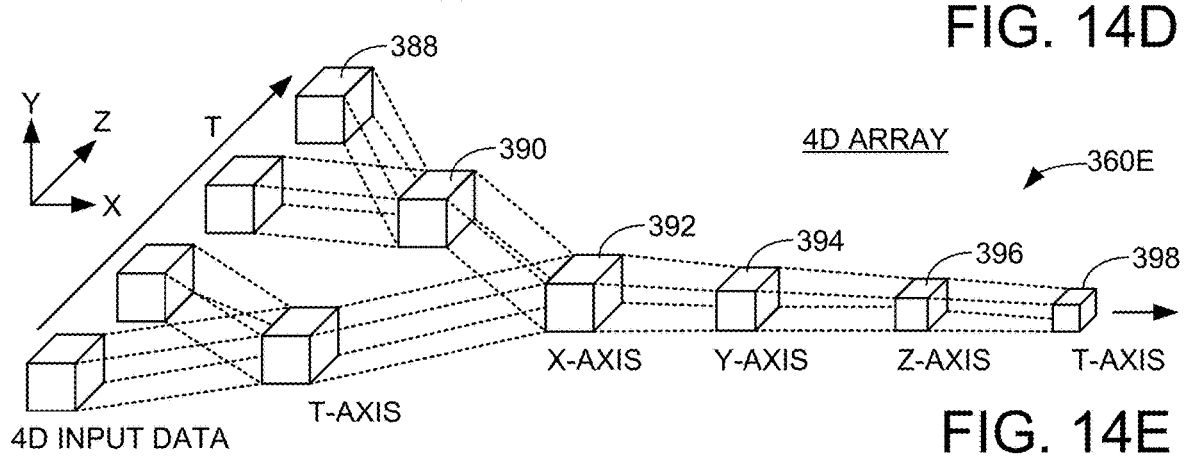

FIG. 14E generally represents a 4D array 360E in which time T is an additional dimension. This can process a variety of data sets including but not limited to moving 3D images (such as a succession of frames, etc.). The input data sets are represented by blocks 388, and these are respectively processed in the T, X. Y and Z axes by successive layers 390, 392, 394 and 396. In some cases, the processing may repeat such as shown by second T-layer 398, or other processing can be supplied.

Accordingly, an IGL-ANN array can be arranged and trained to detect a portion of an input image, with a separate filter configured to evaluate a different area of the image, detect different types of features, etc. Similarly, the nodes can be arranged to process multiple dimensions of data through separate layers or switching sequences.

Figure 15:
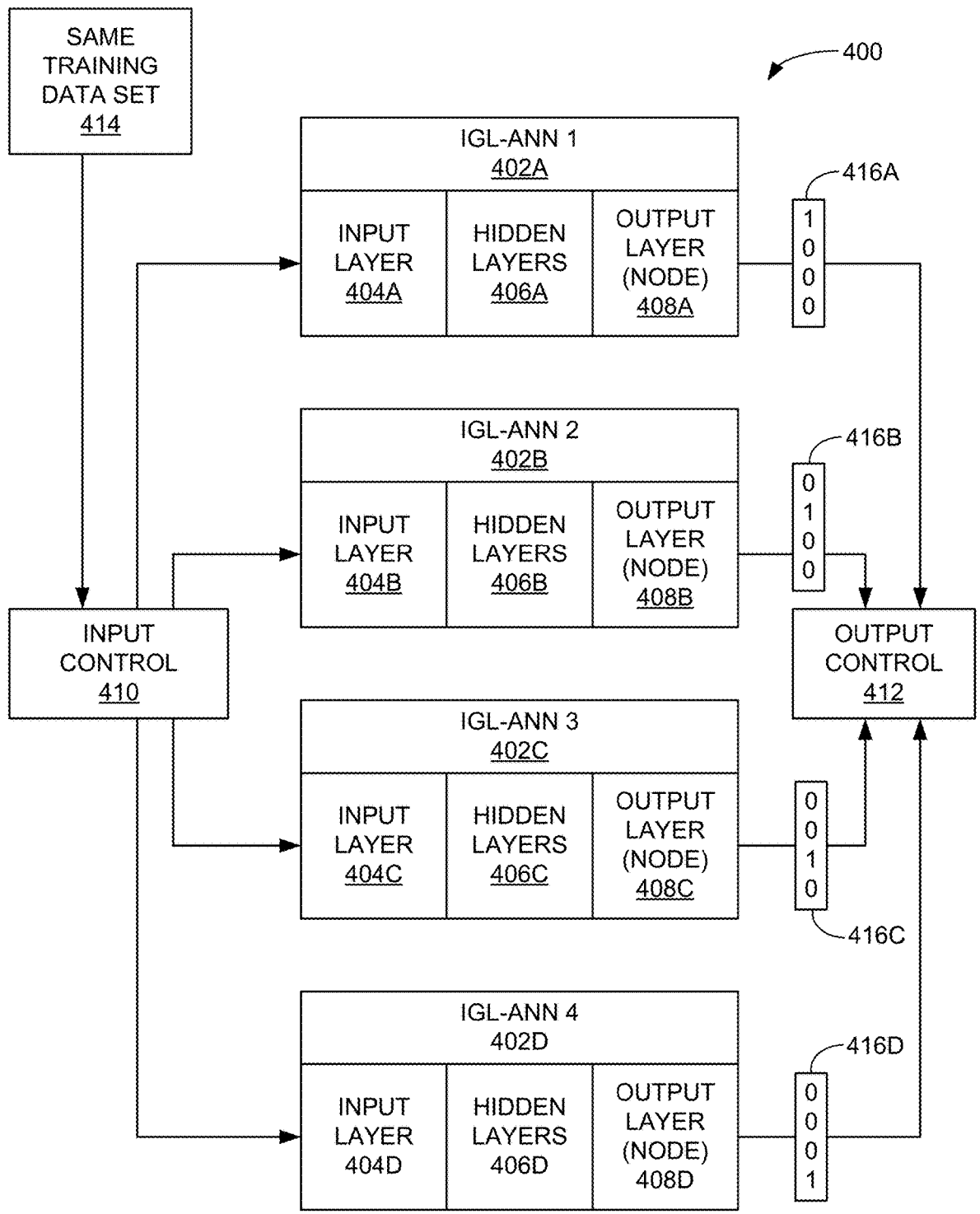
FIG. 15 is a functional block representation of another IGL-ANN system configured to process multi-output data in accordance with further embodiments.

FIG. 15 shows another IGL-ANN system 400 in accordance with further embodiments. The system 400 is configured to process data sets with multiple outputs. In this simplified example, there are a total of four (4) outputs and hence, four stages 402A, 402B, 402C and 402D which operate in parallel. Each stage is nominally identical and constitutes a separate IGL-ANN section that converges to a single node output (in this example). Thus, each stage includes a corresponding input layer 404A, 404B, 404C and 404D, one or more hidden layers 406A, 406B, 406C and 406D, and an output layer (node) 408A, 408B, 408C and 408D.

An input control block is denoted at 410 to process the input data supplied to the system 400, and an output control block is denoted at 412 to process the outputs provided by the respective stages (sections) 402A-402D. The training data are supplied by block 414. The same training data may be supplied to all four stages, with each stage trained to detect a different output. These are denoted by blocks 416A, 416B, 416C and 416D, which provide output sets of (w, x, y, z) so that the first stage is trained to detect the w (first) bit, the second stage 402B is trained to detect the x (second) bit, the third stage 402C is trained to detect the y (third) bit, and the fourth stage 402D is trained to detect the z (fourth) bit.

To give a practical example, assume that the training data of block 414 is the so-called MNIST (Modified National Institute of Standards and Technology) handwriting data set. As will be recognized, the MNIST data set is a database of handwritten digits that is commonly used for training various image processing systems. The MNIST data set comprises approximately 60,000 training data examples and approximately 10,000 testing data samples.

Each sample is a handwritten character from zero (0) to nine (9), and is provided across an array of 28×28 pixels. Each pixel can be assigned a gray-scale value over a selected range; a commonly employed range is 0-255, with 0 representing full black and 255 representing full white.

In this case, the system 400 only has four (4) stages 402A-402D so the system can only detect 4 of the 10 different digits 0-9 in the database (e.g., the stages 402A-402D may be trained to respectively detect the digits 0-3, etc.). Of course, a total of 10 such stages could be utilized to account for all of the digits 0-9.

The system 400 is trained by training each separate stage for each separate possible output. Data are fed into the system by the input control block 410 and chain isolation optimization techniques are applied to reduce loss function error. Thereafter, during normal operation, the predicted output across the networks is the output value (w, x, y, z) with the highest magnitude, as determined by the output control block 412.

Operational Environments

The IGL-ANN systems as variously embodied herein can be implemented a variety of operational environments including in hardware, software, firmware, across distributed networks, specially configured integrated circuits, graphical processing units (GPUs) with multiple processors, etc.

Figure 16:
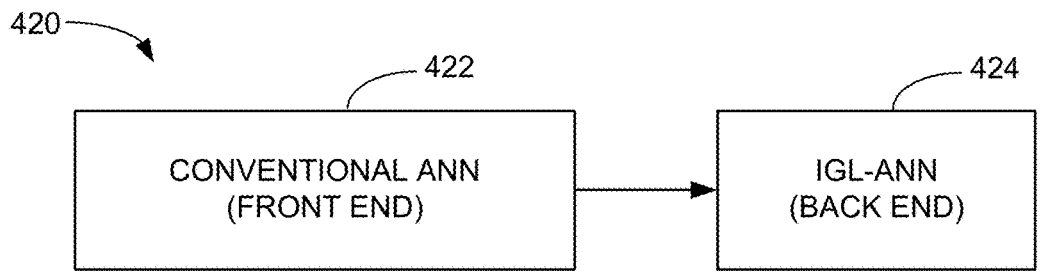
FIG. 16 shows the use of another IGL-ANN as a back end for a conventional ANN in further embodiments.
Figure 17:
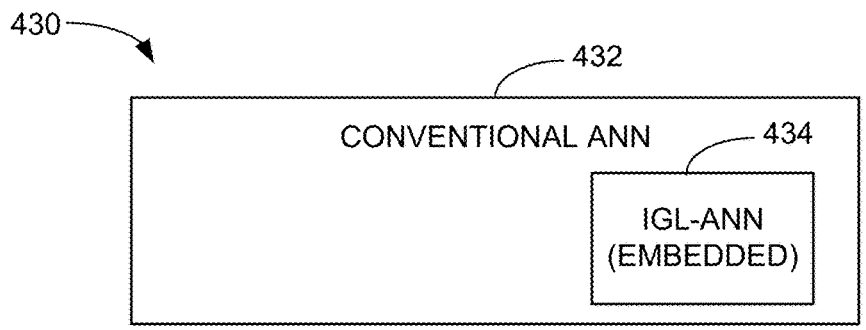
FIG. 17 shows a hybrid ANN system with another IGL-ANN embedded within a conventional ANN in further embodiments.

FIGS. 16 and 17 show operation of the IGL-ANN arrays in combination with existing ANNs. For example, FIG. 16 shows a system 420 where a conventional ANN 422 (such as in FIG. 2) operates as a front end to a processing sequence, and an IGL-ANN 424 is configured as a back end processing section to take the outputs of the front end system 422 and further process to reduce errors. Because of the speed and capabilities of the IGL-ANN processing, the capabilities of the conventional ANN may be enhanced by the addition of the IGL-ANN unit. Other arrangements are contemplated, including using the IGL-ANN as a front end pre-processor for a conventional ANN, etc.

FIG. 17 shows another system 430 where an otherwise conventional ANN 432 has an embedded IGL-ANN section 434 as an integral section of a larger network. It is contemplated that using an IGL-ANN such as 434 as a separate operational module can provide certain advantages to an existing network architecture, including but not limited to operation as a convolutional filter, etc.

Figure 18:
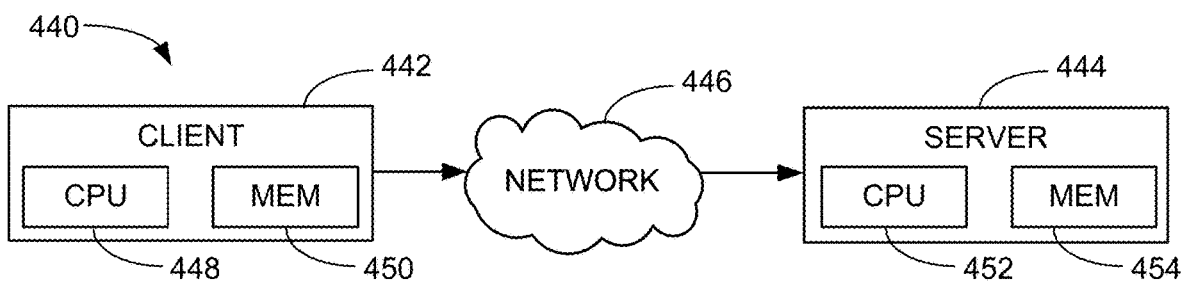
FIG. 18 shows an exemplary networked computer processing environment in which various embodiments of the present disclosure can be advantageously practiced.

FIG. 18 shows a generalized computer processing environment 440 in which various embodiments of the present disclosure can be advantageously practiced. The environment 440 includes a local client device 442 coupled to a remote server 444 via one or more intervening networks 446.

The client device 442 can take any number of suitable forms such as but not limited to a desktop computer, a laptop, a tablet, a smart phone, a work station, a terminal a gaming console, an autonomous vehicle, a UAV, or any other processing device. The client device 442 is shown to include at least one programmable processor (central processing unit, CPU) 448 and local memory 450. In some embodiments, the various embodiments disclosed herein can be modeled and implemented using software/firmware/hardware executable by the client device. A connection to the network 446 can be utilized but is not necessarily required.

The server 444 may be node connected to other devices (not separately shown and may include an edge device, a data processing center, a local network attached storage device, the IPFS (InterPlanetary File System), a local service provider (such as an on-demand cloud computing platform), a software container, or any other form of remote storage and/or processing device communicable to the client device 442 via the network. As such, the various embodiments or portions thereof can be executed at the server level via server CPU 452 and memory 454. The network 446 can be a local area network, wired or wireless network, a private or public cloud computing interconnection, the Internet, etc.

With regard to the operational environment in which the various embodiments can operate, any number of options are available including the following:

Supercomputers: the system can be implemented to run in parallel (many instances of the algorithm running together sharing information) on supercomputers.

GPUs: the system is amenable to being programmed into a GPU. For example, GPUs commercially available from Nvidia Corporation have a proprietary onboard programming language referred to as "CUDA" in which various embodiments can be written in and implemented in a parallel fashion.

Multi-core processors: the system is adapted to be easily executed in a multi-core processor. For example, different cores can be assigned to different stages/sections to operate in parallel.

Dedicated, custom designed hardware IC chips: the system is readily implementable in hardware, and such systems will likely be the fastest, by orders of magnitude over any other alternative. For LLMs with billions of parameters, this implementation will be particularly effective.

Parallelization

Parallelization is a particular feature of the various IGL-ANN systems embodied herein. Parallelization can be understood as computational processes that are run simultaneously on more than one thread/process/processor/CPU/computer on a LAN/computer on the Internet, etc, in solving a single problem simultaneously. Many processes that exist are effective, but cannot be parallelized, or can only be parallelized with much difficulty. Since it is ubiquitous that multi-core processors and GPUs are widely available, the most useful processes in modern environments are sometimes referred to as "embarrassingly parallel."

The term embarrassingly parallel is a term of art which refers to the ability of a computing process to be easily divided into a number of independent parallel tasks, and there is little or no effort required to separate the problem and little or no dependency or communication between the parallel tasks. An embarrassingly parallel process speeds up substantially linearly as the process is executed on multiple processors.

For example, having 10 processes running in parallel will provide a 10× speed up (as opposed to a less desirable value like 2.5× or 4×). GPUs, for example, can have thousands of processor cores. A process that is embarrassingly parallel, or close to embarrassingly parallel, is particularly suitable for execution on a GPU.

The extent to which a process is embarrassingly parallel is generally related to the so-called Amdahl's Law, which generally states that the overall performance improvement gained by optimizing a single part of a system is limited by the fraction of time that the improved part is used. Since the IGL-ANN systems as variously embodied herein tend to have less than 1% of the overall processing that cannot be reduced, this means that over 99% of the IGL processing can be parallelized, either at the process level or at the node level (or both). This results in a highly desirable linear increase in speed when implementing the optimization process using multiple parallel processors.

Figure 19A:
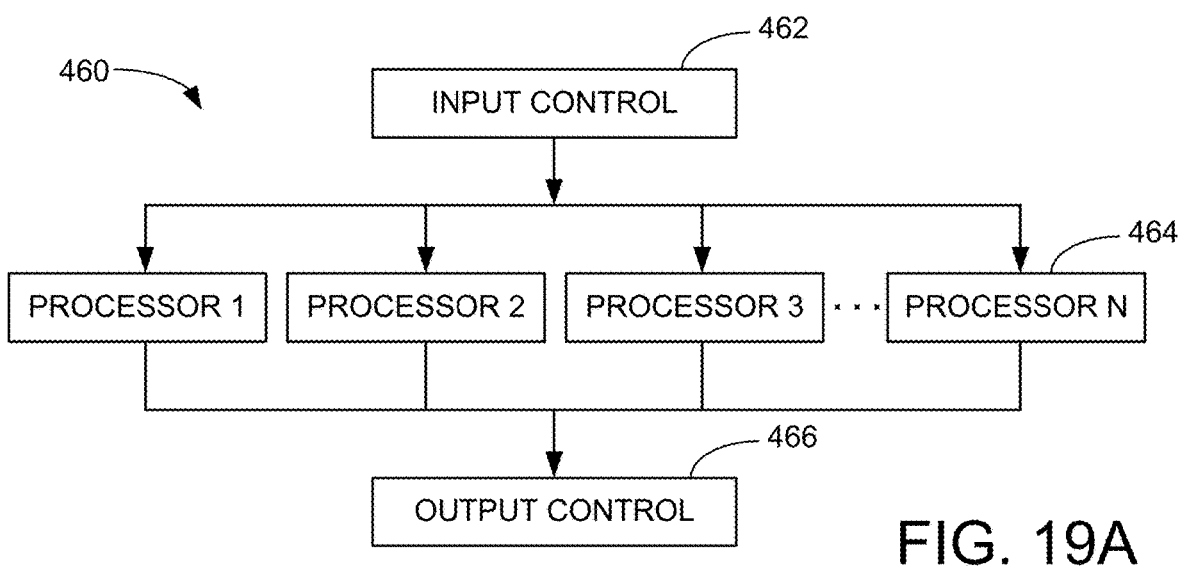
FIG. 19A is a functional representation of a parallel data processing environment for a selected IGL-ANN in accordance with further embodiments.

One parallelization approach is generally represented by system 460 in FIG. 19A, where an input control block 462 is coupled to N parallel processors 464. During the optimization training of a given IGL-ANN, one approach is to apportion different sections of nodes in the array to each of the N processors 464 and have the associated processor optimize those nodes. The best values for the weights and bias values (e.g., W1, W2, B, etc.) can be shared among the processors as such become available. Because the chain isolation optimization processing tends to only affect a single chain of nodes, the existing values can be stored and manipulated in memory, saving the need for multiple recalculations.

Another parallelization approach using the system of FIG. 19A would be to assign a different section (or channel) of an IGL-ANN to each processor 464. For example, referring again to the multi-channel system 400 in FIG. 15, each of the different sections 402A-402D could be assigned for execution by a different processor 464 in FIG. 19A. In one non-limiting example, a 16 core processor could be configured to operate with 10 cores assigned to a different channel for the respective digits 0-9 in an MNIST application, with the remaining cores operating to support the training operation on the respective channels. Other configurations can be used.

The required interprocessor data transfers are largely trivial since relatively small amounts of numerical data are involved, and could take place on each batch update. All of the processes would communicate their final value for error reduction at the end of each batch to an output control block 466, and the process with the best error reduction value would communicate their current values for W1, W2, and B for each node to the other processes, and the next batch processing would commence.

This further demonstrates the advantages of providing the system without the need for backpropagation, since parallelization of backpropagation is difficult to implement. With backpropagation, one would have perhaps exponentially larger data transfers with larger networks, due to the increased number of nodes and connections. Less memory is required for each model, as well as the sum of the memory for all the parallel models running together. Back propagation in parallel is going to require more memory for all the parallel models, and this may become a bottleneck long before processing speed for large models.

Further performance improvements may be available by providing parallelization at a node level. Referring again to the system 460 in FIG. 19A, each of the processors 464 could be assigned a single node in the IGL-ANN to process. This type of parallelization can be understood more clearly with a reference to FIG. 19B.

Figure 19B:
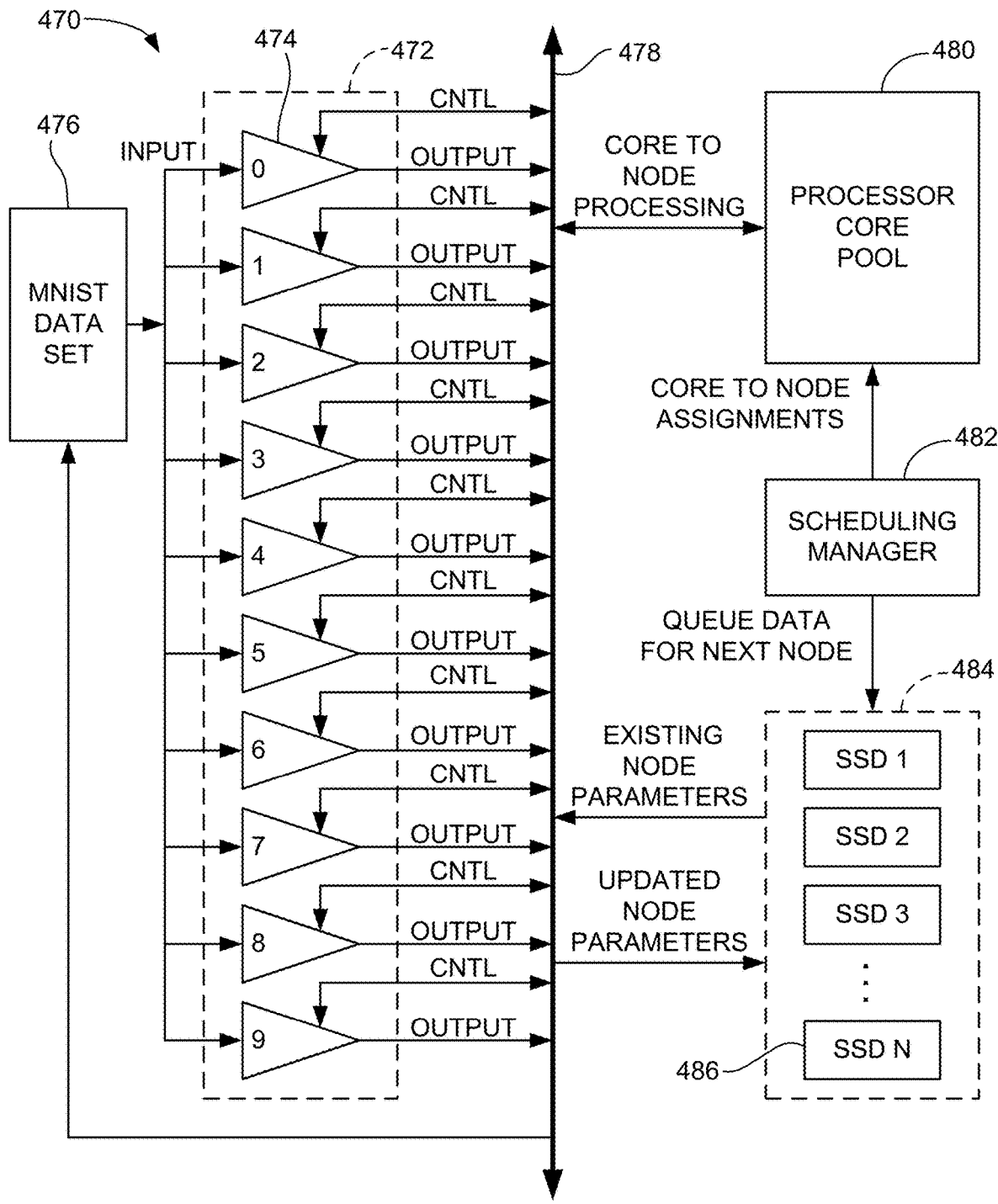
FIG. 19B is a functional representation of another parallel data processing environment used in further embodiments.

FIG. 19B shows another parallelization system 470 that can be implemented in a large scale network environment. The system is particularly suitable for exceptionally large models. The exemplary diagram includes a memory space 472 in which multiple network sections 474 are trained to detect different inputs. In this case, a total of 10 sections 474 are provided corresponding to the digits 0-9 from the MNIST database, represented by input block 476. Other configurations of networks can be constructed, however.

For example and not by way of limitation, the so-called German Traffic Sign Recognition Benchmark (GTSRB) is another well-known testing benchmark with approximately 40 different German road signs and approximately 50,000 images. To detect these signs, a total of approximately 40 different channels 474 could be implemented and trained, one for each sign. Other configurations can be used including non-image classification applications.

The sections 474 may be considered notional in that the active portions of these sections may be loaded to and operated in the memory space 472 (e.g., RAM or other memory) as needed. It is not necessarily required that the full node representation of the entirety of each section be maintained in memory, but rather, only those nodes undergoing evaluation and training, as well as the affected downstream nodes (see FIG. 9).

Continuing with a review of FIG. 19B, element 478 represents a bus or central communication path to allow the respective elements to communicate and transfer data. These elements further include a processor core pool 480, which in this case may comprise many thousands of processing cores each available to carry out processing functions on individual nodes. A scheduling manager 482 queues up the next node for processing and assigns a core to the selected node, so that multiple nodes are being evaluated in parallel.

The parameters and data values may be stored in a storage array 484 having N SSDs 486 (and/or other forms of storage and processing capabilities). The use of a storage array 484 allows the implementation of an overall network of substantially any size to be efficiently handled and managed. While a random selection methodology may be carried out to select nodes for training (as explained more fully below), the order is determined by the scheduling manager 482, so that the manager can direct the SSDs 486 to queue up the data for the next node. The SSDs 484 can thus supply the necessary existing node parameters (including history data) and store updated values as the processing cores test and train each of the nodes, without the inherent latency of the SSDs adversely affecting the processing speed of the nodes.

FIGS. 18 and 19A-19B show that systems constructed using the IGL-ANN sections described herein can be scaled to substantially any desired size, including systems that have thousands of layers (or more), millions of nodes (or more) and billions of parameters (or more). Substantially any ANN application, including but not limited to LLMs and generative AI systems, can be efficiently constructed and trained with IGL-ANNs using a fraction of the time and resources required for existing ANN systems.

Enhanced Error Function

The various loss (error) functions described herein including in the chain isolation optimization training are suitable as a standard error model. These can be characterized as generally operating along the following lines to calculate an Error (E) as follows:

$$\text{Error}(E) = \text{AbsoluteValue}(Y\text{predicted} - Y\text{desired}) \tag{3}$$

where the Error (E) is the value of the loss function to be minimized, Ypredicted is the output of the ANN, and Ydesired is the target value which forms a portion of the test data set. As will be appreciated, Ydesired will usually tend to be either zero (0) or one (1), at least from a normalized standpoint. More specifically, in view of the IGL-ANN embodiments described herein, Ydesired will tend to either be 0 or P.

An Enhanced Error Function (EFF) is disclosed herein that can provide further improvements in convergence rates. The EFF is configured to heavily penalize incorrectly classified predictions. The model was derived empirically, so the following example is illustrative and not limiting. The EFF can be characterized as operating as follows:

If Ydesired=0 and Ypredicted is>=to(A)*P,then Error
(E)=AbsoluteValue(Ypredicted−Ydesired)^(B)
Else Error(E)=AbsoluteValue(Ypredicted−Ydesired)*(C)  (4)

where A, B and C are selected convergence constants used to force convergence of the observed error. In one embodiment, these constants may be set as follows:

A=0.49 B=1.2 C=0.01  (5)

Other values for the constants A, B, and C can be used. However, in this formulation it can be advantageous that A be close to but less than 0.5, B be greater than 1, and C be relatively small. It will be noted that the EFF significantly penalizes "incorrect" classifications, since the threshold is at 0.5*P, so anything less than 0.5*P will be considered a "0" prediction, and anything greater than 0.5*P output from the network will be considered a "1" prediction during testing.

Note the following if Ydesired=1:

If Ydesired=1 and Ypredicted is <=to (1−A)*P,then
Error(E)=AbsoluteValue(Ypredicted−Ydesired)
^B Else Error(E)=AbsoluteValue(Ypredicted−Ydesired)*C  (6)

where (in this case) 1−A=0.51, and B and C are set forth by equation (5) as before. This EFF formulation has been found to work effectively to "slam up" or "slam down" output values to where they need to be to generate correctly classified outputs.

Another EFF can be used to provide further improvements and faster convergence of error during system training. In this related approach, an error forcing function is used to drive oscillating but correctly classified errors towards convergence (low penalty) and to amplify incorrectly classified errors (high penalty).

This alternative EFF sets initial constant values L and M as:

L=0.4*P*0.01 M=0.05*P*0.1  (7)

A Raw Error RE is determined as before, such as by:

RE=Absolute Value(Ypredicted−Ydesired)  (8)

Thereafter, a Computed Error CE may be determined as follows:

If RE is between 0 and 0.4*P,then CE=RE*0.01 If
RE is between 0.4*P and 0.45*P,then CE=L+
((RE−(0.4*P))(0.1)) If RE is greater than 0.45*P
(up to P),then CE=(L+M)+((RE−(0.45*P))
(10))^1.2  (9)

Figure 20:
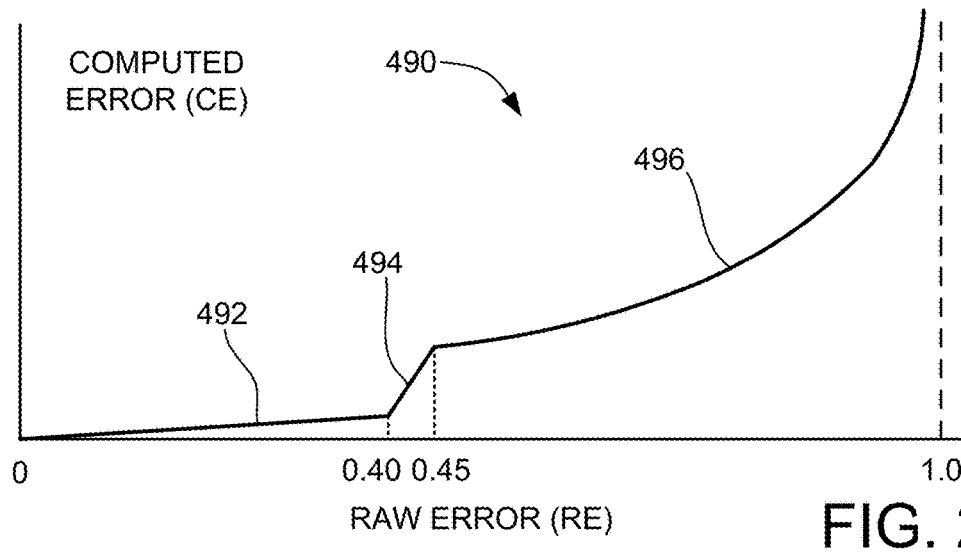
FIG. 20 is a graphical representation of a specially configured error function in some embodiments.

This alternative EFF function is represented by error curve 490 in FIG. 20. The curve 490 is plotted against a Raw Error (RE) x-axis and a Computed Error (CE) y-axis. Segment 492 has a relatively low slope towards 0 and extends for RE values of from 0 to 0.40. Segment 494 is a shelf portion with a steeper slope for RE values between 0.40 and 0.45. Segment 496 is an exponential function for values of RE greater than 0.45.

In this way, correct classifications are rewarded and incorrect classifications are provided with an exponentially greater penalty. The function tends to push oscillating classifications around the midpoint down the shelf 494 and into the convergence zone of segment 492. It has been found experimentally that the error function of curve 490 can significantly correct prediction rates, reduce training times and achieve higher overall success rates (including above 99% to 100%).

In sum, a calculated loss function error can be determined using an EFF with one or more convergence constants to accelerate convergence of the loss function error, such as the constants defined by a first model via equations (4)-(6) or via a second model via equations (7)-(9), as each set of node parameters are adjusted during the chain isolation optimization process.

Intelligent Test Data Pruning (Culling)

In many training data sets, some percentage of all of the input locations are always zero or some other null value. These zero locations can include background areas and not part of the depicted characters in the test data. For example, the MNIST handwriting training data set uses test data arranged in an array of M×N pixels (e.g., 28×28 pixels), and in each case for all of the digits 0-9, about 20% of these pixels are always zero. Usually, the border of 3-6 or more pixels around the edge are zero, and many of the nodes have X1 and X2 inputs from the data that can be identified as always zero before training begins.

These zero inputs provide no useful information and cannot reasonably contribute to effective learning. Hence, further embodiments disclosed herein perform an initial pruning (culling) operation to identify and eliminate those pixels that are always zero. The ability of the IGL-ANN to model logic gates provides a particularly useful capability in performing this pruning operation, although other techniques can be used as well.

In further embodiments, all of the nodes forward in the chains that have all pruned inputs are also pruned out as well and are not further examined or update. For example, reference is made to the ALG-ANN discussed above in FIG. 11; those input nodes corresponding to always zero can be ignored, set to zero, never updated in the evaluation sequence, etc.

Figure 21:
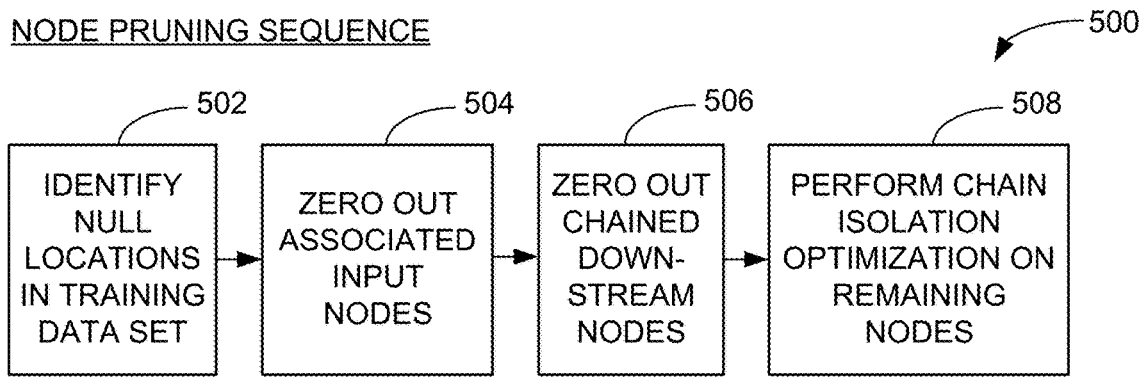
FIG. 21 shows a node pruning sequence that may be carried out in accordance with further embodiments.

FIG. 21 provides a node pruning (culling) sequence 500 to illustrate this process. The flow in FIG. 21 is merely exemplary and can be modified as required.

At block 502, null (e.g., zero) nodes are first identified in the input data. This can include a combinatorial comparison of all of the data sets on a pixel-by-pixel basis to ensure that no useful information is provided in any of these locations. Other techniques, including empirical or heuristic techniques, may be employed.

As noted above, the null locations may tend to mostly appear near the edges of the respective test samples in an image classification system such as a MNIST handwriting example, but other locations and types of data may similarly have null data locations across the data set as well. For example and not by way of limitation, the null locations all have a value of 0 for an MNIST data set when gray-scale intensity values of 0-255 are provided for the respective images across the entirety of the data set.

Once the null locations are identified, the process continues at block 504 where the corresponding input nodes that map to these locations are zeroed out. As noted above, in at least most cases no useful information will be supplied to these nodes, so turning these nodes off reduces the total number of subsequent calculations that will be required during training. The nodes may be pruned by setting the respective parameters of these nodes to all zero. For example, see the NULL entry in FIG. 7A which provides (B, W1, W2) values of (0, 0, 0). Other approaches can be used.

A downstream search is next performed at block 506 to trace each nulled out input node forward through the array along each chain path to determine if any downstream nodes have all inputs that are connected to upstream nulled out nodes. If so, these downstream nodes are also pruned (e.g., set to (0, 0, 0)). Once all affected nodes have been identified and pruned, the chain isolation optimization is applied to the remaining nodes at block 508.

Significantly, a pruning operation such as set forth by FIG. 21 is not typically available for, or easily implemented by, systems that use conventional backpropagation techniques. This is because, in a backpropagated MLP ANN, substantially all the nodes in the forward direction are connected to every node in the forward direction. Pruning out a few input nodes will not make much difference, because all of the forward nodes are still connected to valid data in the previous layers one way or another and still need to be examined.

By contrast, in an IGL-ANN, entire chains of nodes with zero values can be pruned out. Some ML data sets have been found to have upwards of 30%, 40% or even 50% (or more) empty or zero nodes, so this optimization has shown to account for further enhancements in the processing speed of an IGL-ANN as compared to a conventional ANN.

In one example, empirical testing showed pruning rates of around 18-20% for IGL-ANN networks configured for MNIST processing are common. It is estimated based on observed data that this type of pruning optimization technique may result in at least 10%, and upwards of around 50%, speed improvements for real-world data.

Batch Learning Scheduling

Another area that can provide enhanced chain isolation optimization operation is referred to herein as a "Batch Learning Scheduling" (BLS) mechanism. It is contemplated that this technique will result in further speed error reductions and enable achievements of close to 100% accuracy in training efforts.

At present, training examples in the ML environment are often presented to the network undergoing training in a randomized fashion. Empirical observation has suggested that about 90% of the training examples are fairly easy for the network to learn, about 8% require more intense training but are achievable, and the remaining about 2% require upwards of 10× to 100× (or more) the time and effort that was required for all of the prior 98%. One illustrative example in the MNIST data set for these problematic 2% is a handwriting test sample where the numeral "1" is written as a diagonally extending line rather than a vertically extending line.

The proposed BLS technique accounts for training examples that are identified as "difficult to learn" by a combination of approaches. In one approach, a first pass at training is carried out to identify difficult to learn examples. These difficult examples can be identified as those that are still incorrectly classified even after training, do not show rapid convergence of loss function rate, or other observed behavior of the system during evaluation.

A flag value can be attached to these difficult test samples, and training can commence again (either continuing from the present state or resetting the system). During this second pass, the training is carried out as before, except that the flagged examples are assigned priority and are presented early and more often until they are correctly classified.

In a related approach, an overall training data set (such as 50,000 items or examples) is selected. For each of a number of successive batches, a subset is randomly selected (such as 10,000 examples) and optimized. At the end of the batch, those examples that continue to be mischaracterized are inserted into the next randomly selected batch. This way, the problem items are selected early and often, allowing the training scheme to continue to process the difficult items until the system correctly classifies them (if possible). Other techniques can be used as well to intelligently select the order and frequency of the presented training set.

Figure 22:
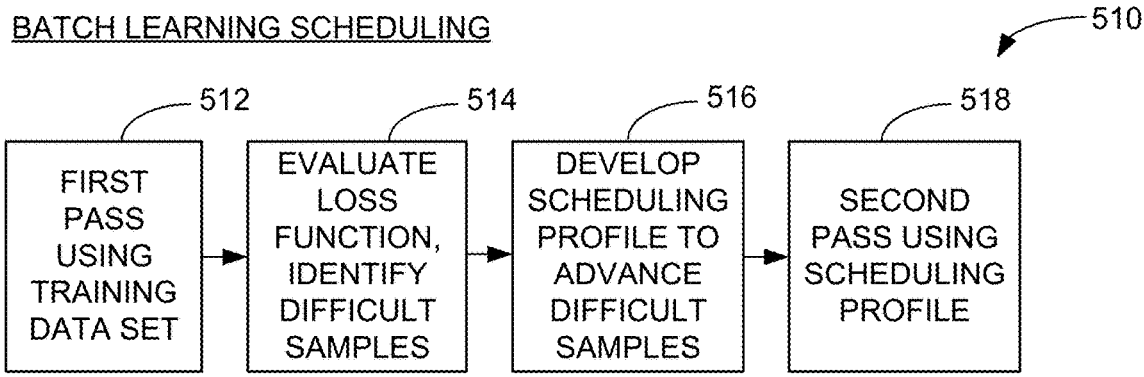
FIG. 22 shows a batch learning scheduling sequence that may be carried out in accordance with further embodiments.

FIG. 22 provides a batch learning scheduling sequence 510 to illustrate these processing operations in accordance with some embodiments. As before, other approaches can be used.

At block 512, a first pass of training is carried out across an entirety of an input training set (such as the MNIST data set described previously, although any training set can be used). At block 514, a full or partial convergence is carried out upon the loss function observed from this first pass at block 512. A loosened error tolerance (e.g., 96% instead of 99%, etc.) can be used as desired.

The goal is to identify those samples from among the test data that are presenting the most difficulty, from a relative standpoint, in loss function convergence. In some cases, the difficult samples can be selected using a priori techniques; for example, it can be reasonably expected that "sloppy" handwriting examples, such as malformed characters (e.g., diagonal "1s" etc.) may be identified immediately without the need to obtain an output from the system.

A scheduling profile is next developed at block 516 that advances the flagged samples, either or both in frequency and in time, within the sequence. It is contemplated that presenting the flagged samples some multiple times more frequently within the test data set, such as 3X, 5X, 10X etc., can be particularly useful. These can be managed by physically duplicating the difficult samples so that more copies are present in the test data, or by periodically inserting the difficult samples more frequently than the other samples.

Similarly, advancing the samples so that the flagged examples are presented earlier in the training process can beneficially train the system early where large changes are still being made to the various parameters. Any number of mechanisms can be used to develop and implement the scheduling profile, including the use of random number generators (RNGs), tables, etc. Once the scheduling profile is developed, the sequence continues at block 518 where a second pass through the optimization routine is carried out using the developed scheduling profile from block 516.

Empirical testing has demonstrated that batch learning scheduling on the MNIST data set as represented by FIG. 22 provides significant reductions in training time and enhanced classification success rates for all characters. As noted above, purposefully adding incorrectly classified characters during a given training batch to the next batch ensures more frequent emphasis upon the difficult to classify examples. BLS has benefit by itself or in combination with the other optimization techniques disclosed herein.

Data Scaling

As will be recognized by those having skill in the art, a metric sometimes referred to as "Big O Notation" describes a metric for how mathematicians, computer scientists and other related technologists compare algorithms in terms of how much additional effort is required for larger problem sizes (such as more data). Ideally, attempts are made to find algorithms that scale linearly, or less than linearly, with additional data. For example, for a slower algorithm it may take 4× the processing time/power for a 2× increase in data size, 16× for 4× the data, etc.

Some other algorithms require "factorial" scaling, where n is the number of examples and the scale rate may be at n! in terms of additional processing power/time required. A more ideal algorithm would be one that scales at a lower rate such as 2n, 1.5n or even n.

It follows that the various embodiments of IGL-ANNs presented herein scale far more favorably in terms of Big O Notation as compared to networks that utilize backpropagation. This is because the number of required nodes/connections increases significantly with increased data inputs in a conventional system, whereas the IGL-ANNs discussed herein provide a lower scaling rate such as 2n due to the 2 input/1 output node model. As a result, the IGL-ANN should be scalable for extremely large data sets with significant improvements in test time/resources. In terms of algorithmic performance, this may be a performance enhancement improvement of the type that is rarely seen.

Fully Interconnected Layers

The 2-input 1-output architecture discussed so far, where each layer combines two nodes from the previous layer in a regularized row and column reduction methodology, is highly desirable, especially for image recognition. This is because in images, the neighboring pixel values are usually related to each other, since the adjacent pixels represent part of an associated object within the image.

Some input data may have neighboring values unrelated to each other, such as classification data for medical patients for a particular illness or condition. In these and other types of data sets, every data set item may be related (or not) to every other item in the data set.

To explore the relationships between non-adjacent pixels in an input data set, further embodiments of IGL-ANN sections can be implemented to include so-called fully interconnected layers. Unlike the normally connected IGL-ANN layers discussed above, a fully interconnected layer has a node to accommodate every possible combination of nodes in the previous layer (or at least a significant portion of such combinations).

It will be appreciated that a fully interconnected layer will result in an explosion in the number of respective connections within the IGL-ANN. Nonetheless, such interconnections may be useful for certain types of data and problems of a certain complexity. This also shows the flexibility of the IGL-ANN design since different architectures can be chosen in addition to the highly performance oriented 2-to-1 layer to layer node connection protocol.

Figure 23A:
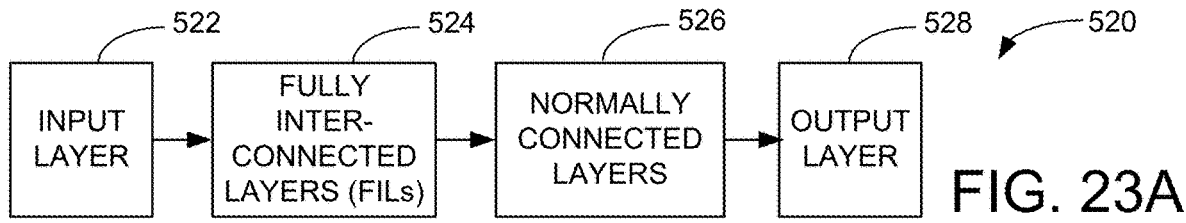
FIG. 23A is a functional block diagram of a hybrid IGL-ANN section with one or more fully interconnected layers (FILs) in further embodiments.

FIG. 23A shows an example IGL-ANN 520, sometimes referred to herein as a hybrid IGL-ANN, with input layer 522, one or more fully interconnected layers (FILs) 524, one or more normally connected layers 526, and an output layer 528. The FILs 524 can be placed substantially anywhere within the hybrid IGL-ANN 520, including immediately adjacent the input or closer to the output.

It is contemplated that, in many cases, it may be advantageous to place the FIL nearest to the input data, but for performance reasons it may be advisable to move the FIL farther up the architecture (e.g., Layer 4-5, etc.). Multiple FILs can also be used, each having one or more normally connected layers in between to reduce the impact (node explosion) from multiple successive fully interconnected layers. This flexibility will allow the system designer flexibility in solving specific problems.

Figure 23B:
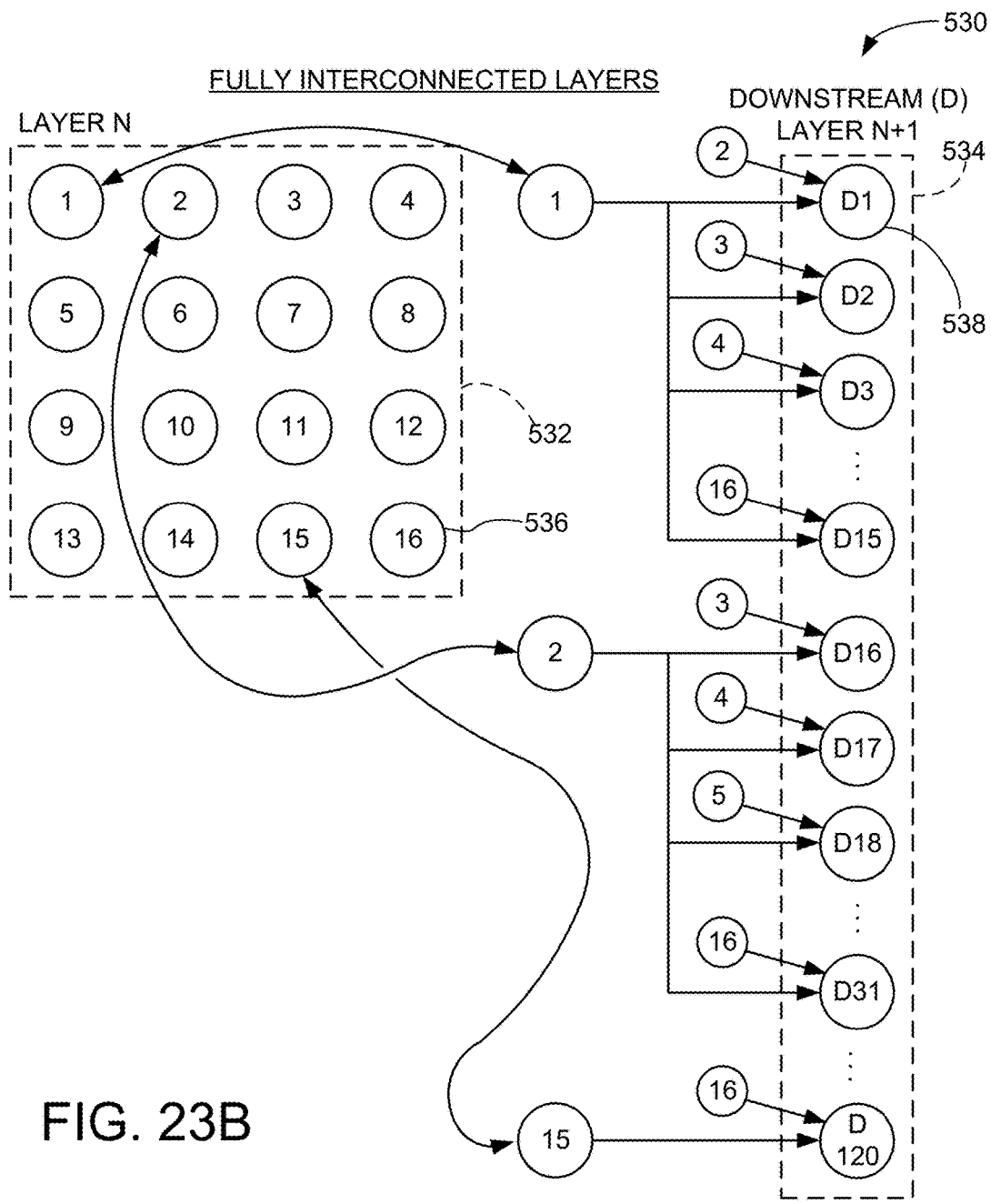
FIG. 23B is a schematic depiction of an FIL arrangement from FIG. 23A in some embodiments.

FIG. 23B shows a similar hybrid system 530 with FILs including an upstream Layer N 532 and a downstream (D) Layer N+1 534. In this simplified example, Layer N has a total of 16 nodes 536 identified as Nodes 1-16. Layer N+1 534 has a total of 120 nodes 538 identified as Nodes D1-D120.

The formula for determining the total number of nodes DN in a downstream layer for an upstream layer with N nodes can be stated as $$DN = (N)(N-1)/2 \qquad (10)$$

In this case, N=16 so DN=120. It can be seen that, in order to accommodate every combination of the 16 nodes 536 in Layer N, Node 1 is connected to each of the remaining Nodes 2-16; Node 2 is connected to each of the remaining Nodes 3-16; and so on down to Node 15, which is connected to Node 16 (for a total of 120 combinations/nodes).

Chain isolation optimization techniques as described herein can still be used, with the caveat that optimizing the parameters (B, W1, W2) for the interconnected nodes necessarily requires a larger subset of nodes that will need to be recalculated as well. For example, to assess a parametric change to Node 1 in Layer N, the impacts upon each of the DN nodes D1-15, as well as the chains of these nodes to the output layer, will need to be calculated. Nonetheless, the techniques can still be carried out significantly faster than existing gradient descent based backpropagation.

Software Modeling and Visualization Tool

It will be appreciated based on the discussion thus far that significant caching of values can take place during the temporary adjustment of nodes in the various chains. In some embodiments, each node in a given IGL-ANN section has a data structure maintained in memory that includes (among many other items) the following variables:

W1←permanent value
W2←permanent value
Bias ←permanent value
tW1←temporary value for the node under investigation
tW2←temporary value for the node under investigation
tBias ←temporary value for the node under investigation
y(1 to batch count)←temporary y values for the nodes in the "chain"
c_Y(1 to batch count)←cached values to be restored if necessary
Ytest ←test output value Other values may be stored for each node as well, and multiple values for each of the above variables may be accumulated. To provide a simplified example, a given training data set may have 1000 examples. A batch size is configured as a subset of the training data set (but the batch size may be the same size as the training data set size). Learning takes place on a batch basis as discussed above.

After a particular batch is completed, a new batch is selected and more learning takes place. While a single pass is carried out on each batch, in alternative embodiments, multiple passes can be carried out on each batch. For example, a batch of 100 training items (examples) might be selected at random from the data set of 1000. Some dataset items can appear twice, or more, or not at all.

Assuming a batch size of 100, training starts by calculating all the 100 y(1 to batch count) values (on each node) based on feed forward through permanent W1, W2, and Bias values, with the training data inputs for each respective batch example (1 to 100). Each node has its own values for y(1 to batch count), but the most important ones are the values at the last node in the network, since those are the overall predictions for each of the training items.

Once all the y(i) values (i here is "index" into the batch set—1 to 100) are calculated for each node, then the chaining can begin. A node is selected at random in the network for evaluation. All of the nodes can be selected in turn, but it has been determined that selecting only a small percentage, such as 2%-5%, is sufficient. This is discussed more fully below.

Each node has stored in memory its respective y(i) values for each batch training example. For the random node that is selected, the first step is to "cache" all of the y(i) output values for itself and all the other nodes all the way up the chain until the output node. That is what the c_Y(i) array values allow. The "c" here stands for "cache". In the software module discussed below, a "copy memory" function which is extremely fast.

All of the existing values in y(i) for each node are instantly copied to the c_Y(i) values. Then for the node under investigation, the parameter values use temporary values tW1, tW2, tBias which are adjusted in a set number of attempts up to a maximum value. However, if a sufficiently great enough error reduction is found, those values are retained and the node processing exits. This could be experienced during the first try, the last try, or at any point in between. As noted above, some examples provide 35 different combinations of parameter values (e.g., all of the various combinations in the table of FIG. 7A plus other various combinations). It will be noted that the foregoing (up to) 35 combinations are tried for each item in the batch.

If the node evaluation completes all of the passes without error improvement, the cached values c_Y(i) are restored to the Y(i) values along the chain. Assuming values for tW1, tW2, and tBias were found that reduce the error, at that point tW1, tW2, and tBias would be copied to W1, W2, and Bias, respectively, and these would become the updated permanent values. At this point another node would be chosen for the chaining optimization techniques and the preceding steps repeated for the new node.

In further embodiments, one method used to check for error reductions is to pass up on the node under investigation, using tW1, tW2, and tBias. Note that only the node under investigation uses the "t" values for tW1, tW2, tBias; all the other nodes in the chain use the permanent W1, W2, and Bias values. The values for y(i) can be passed up for each node in the chain, for training example in the batch (i=1 to batch count), and the error is calculated for that respective example at the output node.

The sum of all of the errors across the batch is the error that is compared to the best previous error (from the prior node). An attractive performance gain here is that if an error reduction is found, the current values for y(i) simply stay in place. If not, the cached values are a "memcopy" away on each node to be restored along the chain all the way up to the output node.

With regard to the random selection of nodes, since the quantity of nodes varies tremendously by layer (for example, Layer 1 may have 10,000 nodes, whereas Layer 21 may only have 16 nodes, etc.), a random selection function can be used that weights the selection of nodes in relation to the number of nodes in each layer. This can be accomplished by calculating the cumulative percentages of each successive layer up to a maximum value of 1. If a random 0 to 1 selection is less than the threshold of the next layer up, that layer is chosen. The respective node row and column can just be randomly chosen from their maximum value multiplied by a random number 0 to 1. Other techniques can be alternatively used. Regardless, the random selection of nodes for evaluation will help ensure the node adjustments tend to be spread out evenly across all of the nodes.

In another randomization approach, a list can be maintained of selected nodes such that previously selected nodes are not selected again until all (or some selected percentage) of other nodes in a given layer have been selected. Another approach can be to flag a selected node that has been adjusted, and to not make further adjustments to that node after a certain total number of adjustments have been made (including a single adjustment). Other mechanisms can be used to ensure a full distribution of node evaluations take place.

These and other aspects of the chain isolation optimization training can be carried out using a software modeling and visualization tool 540 constructed and operated in accordance with some embodiments. The tool 540 represents software program instructions stored in a memory and used to generate and train an IGL-ANN. Other mechanisms can be used so the tool is merely exemplary and is not limiting.

The tool 540 includes three main operational modules: a modeling module 542, a controller module 544 and a viewer module 546. The modeling module 542 generally operates as a user interface and front end processor to set up a network for training. To this end, the module 542 can include a user interface I/F block 548, a parameter selection and configuration (params) block 550, and a model generator 552.

While not limiting, in some embodiments a particular IGL-ANN will be generated responsive to an analysis of the input data set. To this end, external data, also stored in a computer memory, can include an IGL-ANN node data set 554, a training data set 556 and a test data set 558. The block 554 represents the IGL-ANN itself (in software form) along with the various temporary and other cached values described above.

The training data set 556 can take any number of forms (including but not limited to the aforementioned MNIST or GTSRB data sets). The test data set 558 may also be related to the training data, but represents pristine data that the system has not yet seen. In other words, in some testing schemes it is common to train a particular ANN using training data, and then once training has been optimized, present data that the system has never seen before to see how the system performs.

Significantly, IGL-ANN sections configured and trained as disclosed herein have tended to provide output test data success rates that are higher than the final training data success rates. That is, once a final error value has been determined on the training data, the final error value for the subsequently applied test data is better, not worse.

The controller 544 provides overall control of the system during modeling, training and subsequent operation. To this end, the controller 544 includes an analysis engine 560, a scheduler 562 and a batch manager 564. The viewer module 546 reports the progress and results of the operation of the IGL-ANN, including various optional graphical and heat map based displays as well as more traditional reporting functions. To this end, the viewer provides back end processing capabilities including an operating system (OS) API block 566 to call functionality supplied by a host OS as required, a color manager 568 to assign and track various color assignments as discussed below, and a display 570 to provide output in a visible or other suitable form (e.g., database, etc.).

Figure 24:
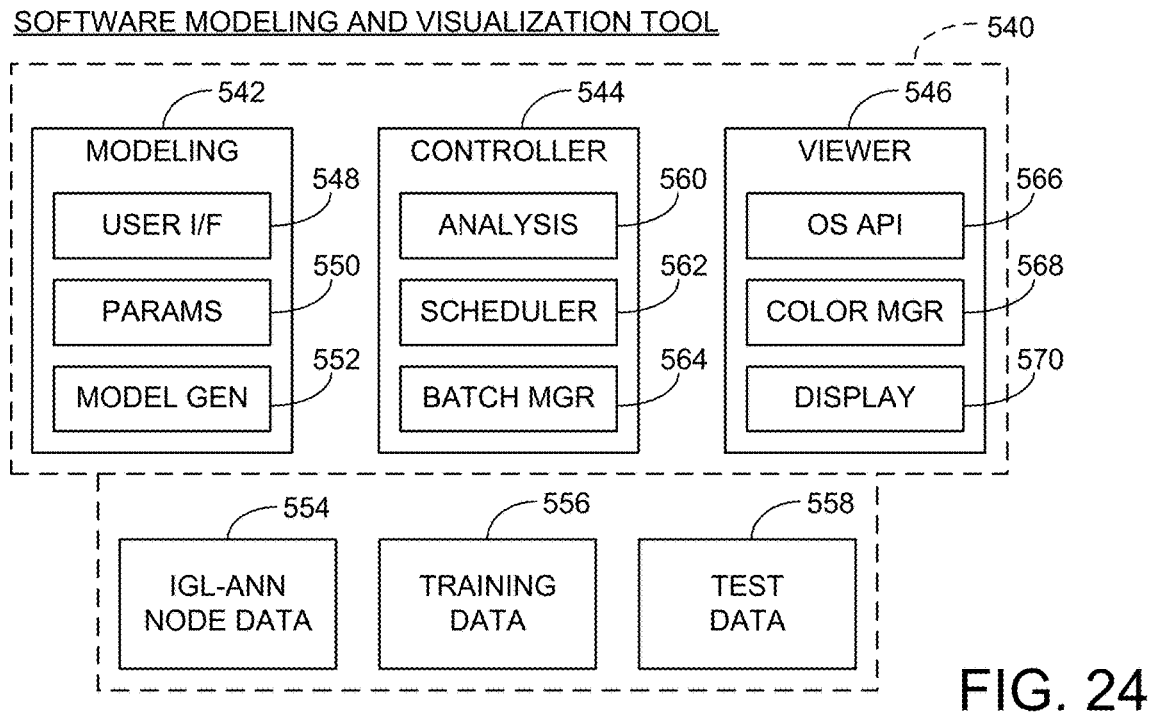
FIG. 24 is a functional block representation of a software modeling and visualization tool in some embodiments.
Figure 25:
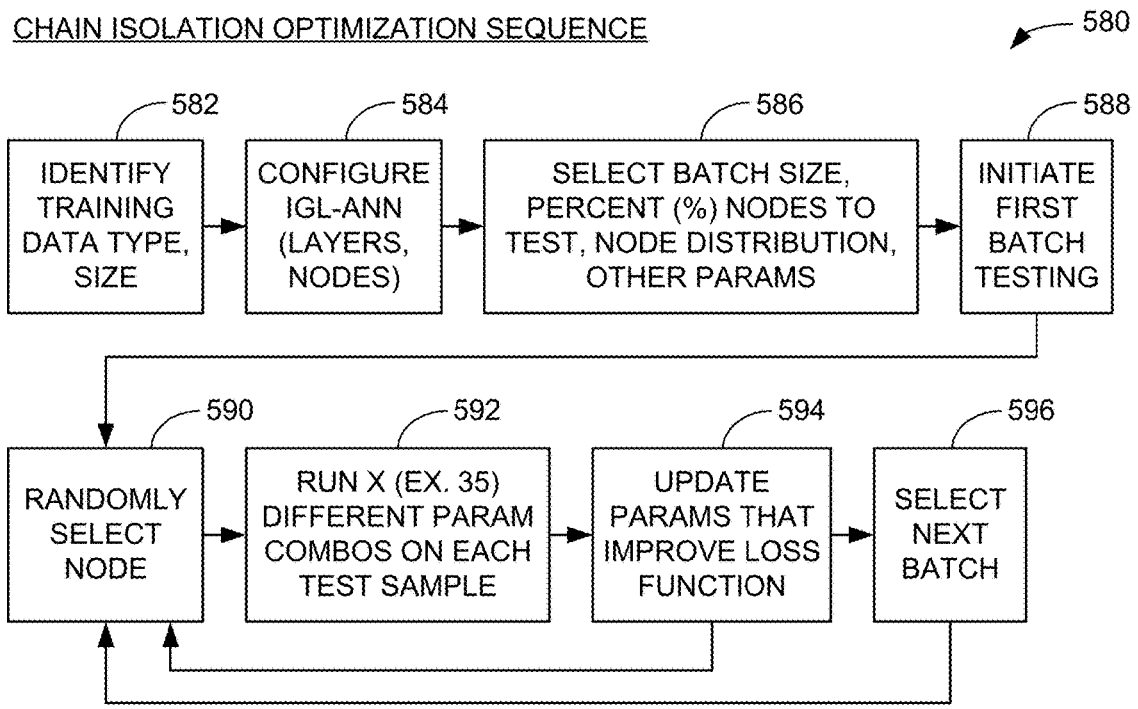
FIG. 25 shows a sequence diagram for a chain isolation optimization process carried out by the tool of FIG. 24 in some embodiments.

FIG. 25 is a revisited chain isolation optimization sequence 580 to expand upon the prior discussion of chain isolation optimization above, including that provided with reference to FIGS. 9-10. The sequence 580 is contemplated as being carried out using the tool 540 from FIG. 24, but such is not necessarily required. For brevity, previously discussed aspects will not be described again in detail.

It is contemplated albeit not necessarily required that the routine operates to build, train and prepare for subsequent use an IGL-ANN. To this end, block 582 commences by identifying various requirements of the system, including the nature, type and extent of the training data set (e.g., 566, FIG. 24). Based on these and other parameters, an IGL-ANN is initially constructed (in this case, in software). This will include the number and sizes of the respective layers, the interconnection strategy, the total number of nodes, whether convolutional filters, fully interconnected node layers, dummy nodes, etc. will be required, and so on. In some cases, selection alternatives may be presented to the user via the interface block 548 (FIG. 24) to make particular selections and adjustments to the model.

Using the MNIST data set as an example, it will be recalled that the data set provides images for 10 different characters in an 28×28 array of pixels for each character. These factors may result in a 10 stage configuration to separately detect each possible output (0-9), and some number of input values in the first layer to select how the scanning may take place (e.g., vertically, horizontally, etc.). In some cases, the first layer may be selected to have multiple sets of nodes that map the same input data (such as a 4-quadrant arrangement) to further emphasize parallel processing through the network.

As noted above, substantially any numbers of layers and nodes per layer can be selected. By way of illustration, commonly deployed models for the MNIST data set have typically had from 10-14 layers in each section. The tool 540 can be configured in some embodiments to allow the designer to specifically set the total number and set of layers, or the system can do so automatically. Other arrangements are suitable and can be used.

Further selections are made at block 586, including batch size, percent (%) nodes to test during each batch, node selection and distribution strategies, initial values for the various nodes, as well as other parameters as required. As noted above, one particularly useful approach is to take the entirety of the MNIST data set (60,000 training images and 10,000 test images) and divide these so that 50,000 images from the training data are used for batch runs and the remaining 10,000 images are used as an intermediary test at the end of every $10^{th}$ batch (or some other value). The 10,000 test images are held in reserve and only used at the end.

In this approach, a batch size of 10,000 randomly selected images from the pool of 50,000 may be selected for each batch, with flagged images (incorrectly characterized) during a given batch fed forward and included in the next batch. With regard to initialization, random parameters (B, W1, B2) work well, but it has been found useful to instead set all of the nodes with initial parameters corresponding to the weighted sum setting (e.g., (1, 0.5, 0.5)).

As noted above, the total number of nodes to be tested during each batch is selected. While all of the nodes can be selected and evaluated in turn, it has been found that as few as 2% of the nodes can provide rapid convergence in error rate, with 4% being another particularly useful value in some cases. It will be appreciated that evaluating and testing only a relatively small subset of the overall node count greatly accelerates the process.

Other parameters can include various error thresholds, the type of error forced function processing desired (such as EFF described above), the total number of batches to run, etc. If parallel processing is applied, further assignments can be made such as assigning each stage (character) to a different processor core, etc. All of these and other system configurations may be carried out via the user interface or via other means.

At block 588, the first batch is selected and processed. During such processing, for each of the 10,000 images selected for that batch, a node is randomly selected at 590, and a total of X various combinations (such as 35 combinations) are applied to the selected node at block 592. Values are updated for the nodes along the associated chain (see e.g., FIG. 9) and if an improved set of parameters is located, these are implemented (block 594). This processing is carried out for the selected node for all of the images in the batch, after which a new node is selected, the foregoing processing is repeated, and this continues until the total number of nodes (e.g., 4%, etc.) have been adjusted. At this point, the 10,000 reserved training set images can be applied to determine an updated Yout error value, and the next batch is selected at block 596.

Figures 26A, 26B:
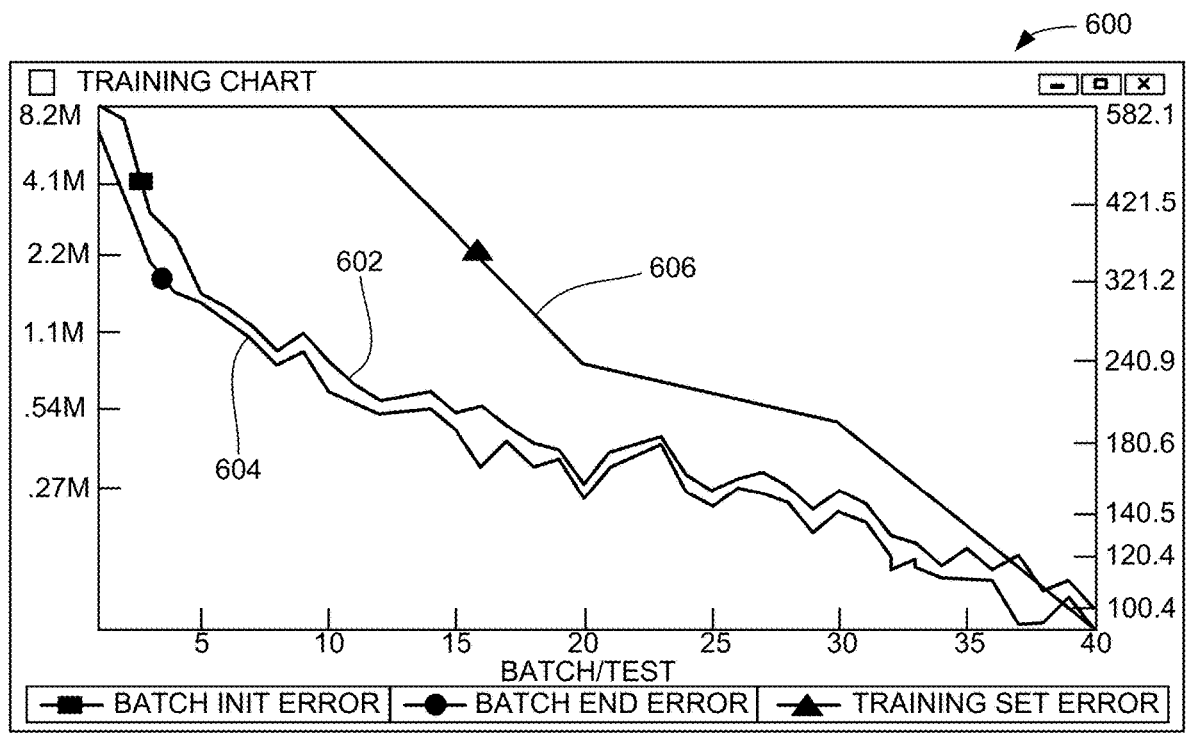
FIG. 26A is a table showing a configuration for an example IGL-ANN configured and trained using the processing sequence of FIG. 25.
FIG. 26B is a graphical representation of error rate data obtained from the processing sequence of FIG. 25 in some embodiments.

FIG. 26A shows a table for an exemplary IGL-ANN configured using the tool 540 of FIG. 24 and the sequence 580 in FIG. 25 in some embodiments for the MNIST data set. In this example, a 14-layer configuration was selected with 12,587 nodes arranged as shown.

FIG. 26B is a graphical depiction 600 of ongoing improvements in error rates during testing. These are updated and available in real time during the training process via the viewer module 546 in FIG. 24. Batch numbers are represented along the horizontal axis (a total of 40 batches have been processed at this point), and error rates are shown along logarithmic bounding vertical axes (expressed in raw numbers, not percentages).

Curve 602 represents the beginning error rate at the start of each batch, and curve 604 represents the ending error rate. The vertical distance between curves 602, 604 shows the improvement during that particular batch processing. Curve 606 shows overall improvement at the end of every 10 batches. The system has demonstrated convergence to very low error rates (98-99%) over a short interval (from a matter of minutes to a couple of hours).

Figure 26C:
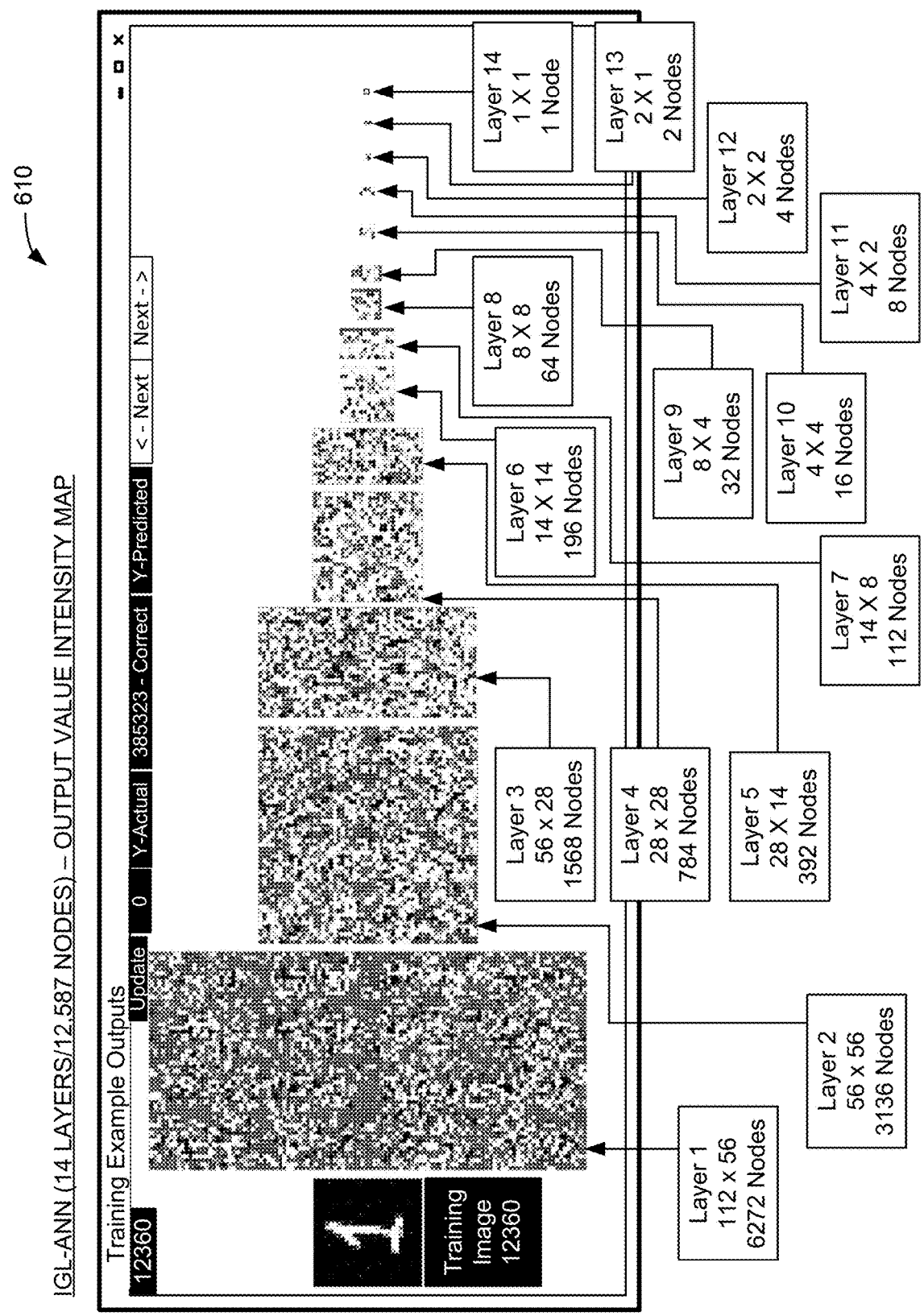
FIG. 26C shows a graphical depiction of the example IGL-ANN from FIG. 26A during a training operation.

FIG. 26C is a graphical depiction 610 of the network from FIG. 26A during operation. In this case, a (gray-scale) heat map type display is shown for each of the 14 layers arrayed from an input (evaluating an image of a "1"). The intensity of the output is normally represented in color in relation to the magnitude of the respective output values (Y1) from the associated nodes in each layer. The largely uniform density of colors indicates the spread processing nature of the evaluation. An advantage of the IGL-ANN sections as described herein is that the internal states and operations of the nodes can be displayed and monitored in real time (or near-real time).

Figure 27A:
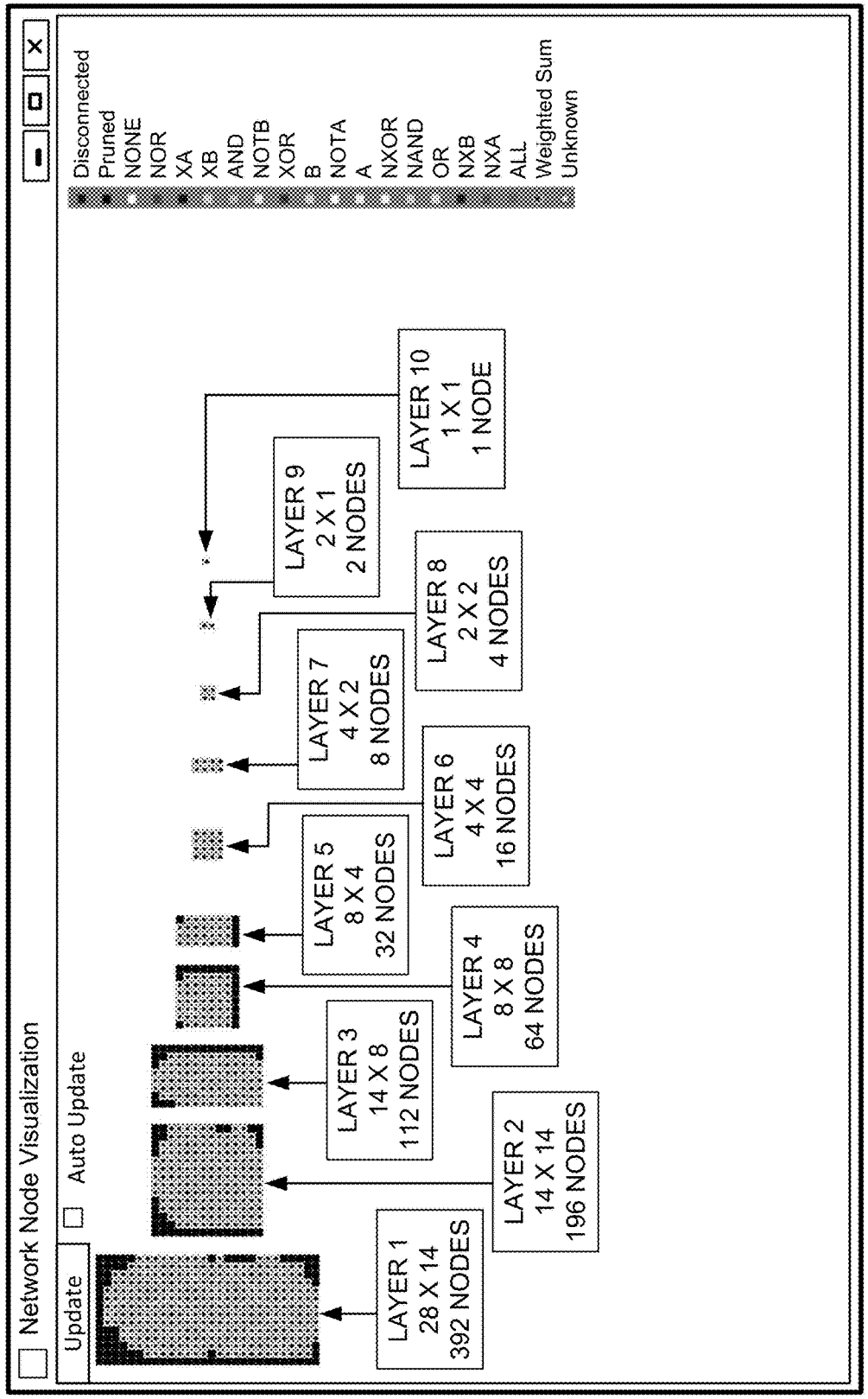
FIG. 27A is a graphical depiction of another example IGL-ANN configured using the sequence of FIG. 25 in an initialized state.

FIG. 27A is another graphical depiction 620 of another AGL-ANN section configured using the tool 540 and sequence 580 discussed above. As before, the network is configured to process the MNIST data set. However, in this case, only 10 layers and 819 nodes are used. While this network is significantly smaller than the network discussed in FIGS. 26A-26C, extremely fast conversion rates were nonetheless observed.

Of particular interest is the fact that the representation 620 in FIG. 27A is the initialized network prior to training. The darker pixels in the first five layers (Layers 1-5) represent pruned nodes. This analysis may be initially carried out by the tool 540 by analyzing the entire training set in relation to the configured network and automatically pruning the unnecessary nodes.

Figure 27B:
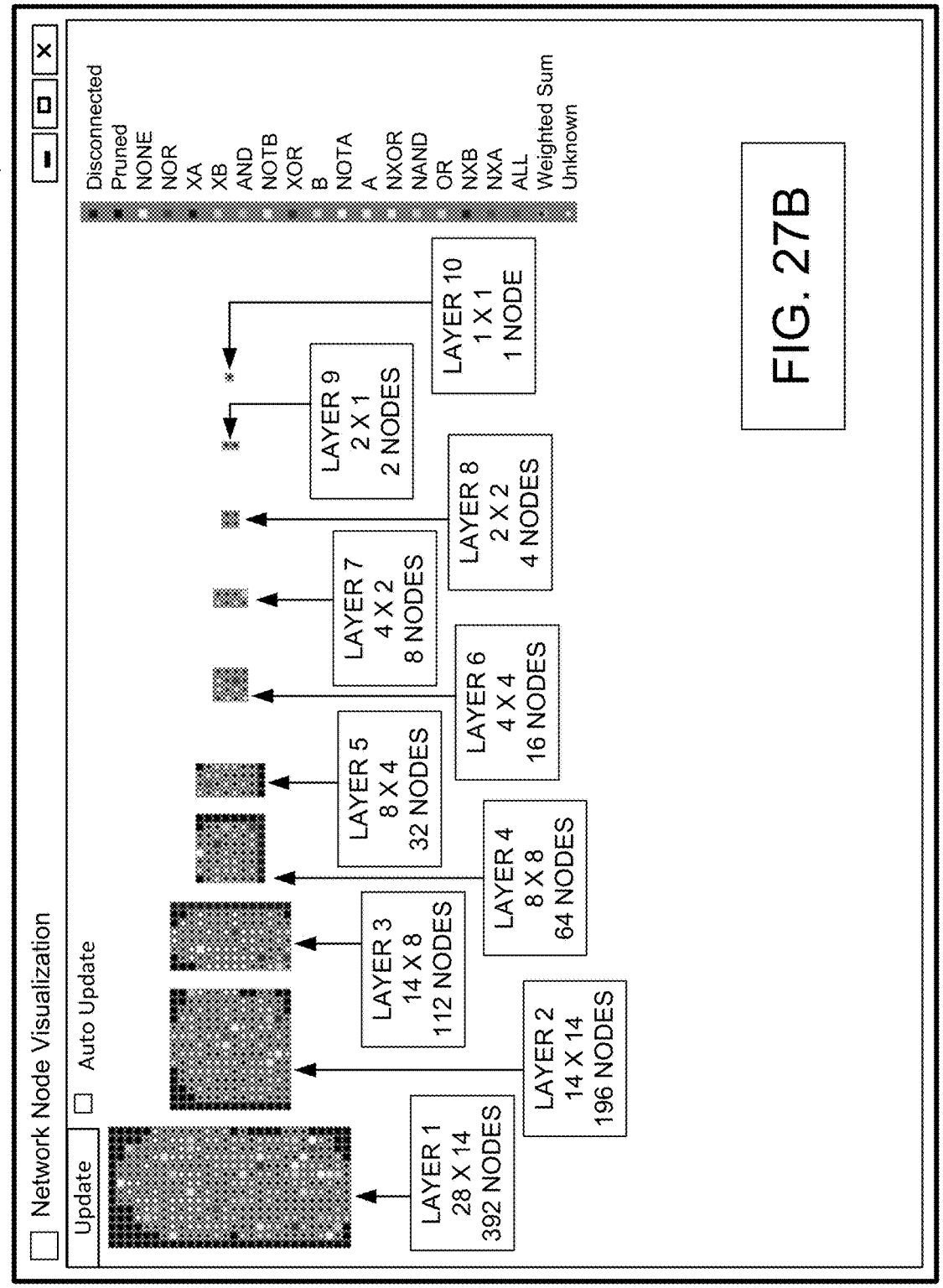
FIG. 27B shows the IGL-ANN from 27A during ongoing training.

FIG. 27B is a corresponding graphical depiction 630 of the same network from FIG. 27A at an intermediate stage of the training process. This provides a heat map type display with the respective nodes categorized by gate logic type. That is, based on color intensity the various Boolean logic functions of Table 7A are identified (as well as near-Boolean nodes). A large percentage are unknown, meaning that the respective parameters (B, W1, W2) do not easily map to any of the parametric combinations in FIG. 7A.

This graphically enables the designer to monitor the progress of the training process and determine the distribution and flow of the data through the layers. A grouping or concentration of activity can provide useful insights into subsequent designs with adjustments to address problem areas.

Figure 28A:
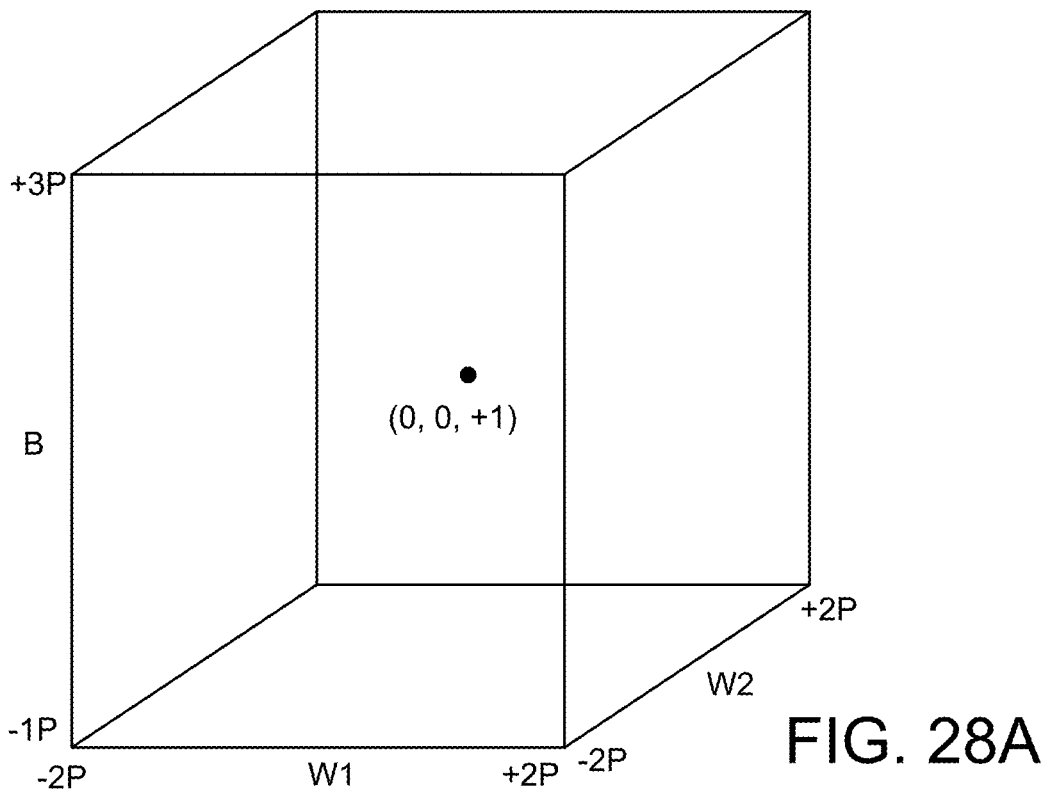
FIGS. 28A and 28B show respective representations of another example IGL-ANN during initialization and during ongoing training in further embodiments.
Figure 28B:
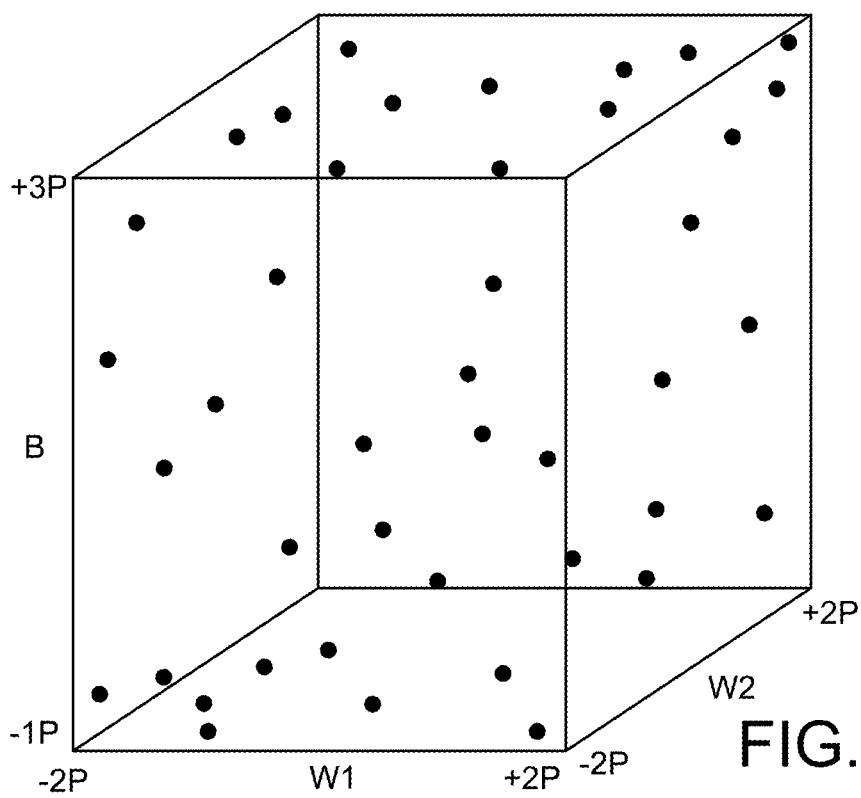

FIGS. 28A and 28B show another graphical representation that can be made of the data from a selected IGL-ANN during training and subsequent operation. FIG. 28A shows a 3D map of the parameter values (B, W1, W2) with the initial settings prior to training, and FIG. 28B shows a corresponding map of these values during training. The ranges for the parameters are discussed above in FIG. 7 and associated table. As noted previously, all of the nodes in the network are set to initial values of W1=0, W2-0 and B=1 (NULL) in this example (see FIG. 28). Other initialization states can be used, including randomly assigned values.

System Integration

Figure 29:
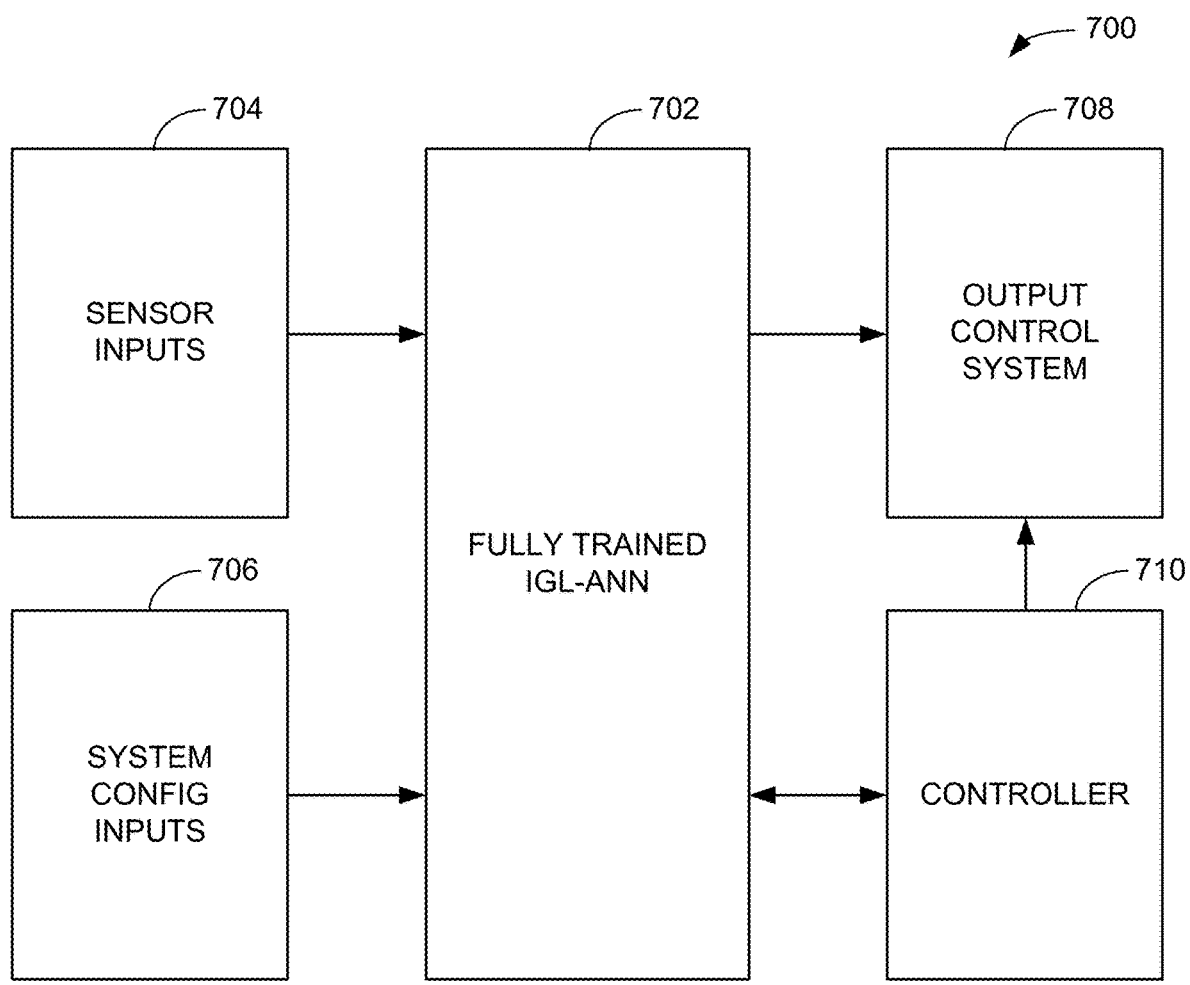
FIG. 29 shows a functional block diagram of a system that incorporates a fully trained IGL-ANN in accordance with further embodiments.

FIG. 29 is a functional block representation of a system 700 that can incorporate a fully trained IGL-ANN as described above. The system 700 can take substantially any desired form of ML based application including but not limited to an autonomous vehicle (e.g., self-driving car, autonomous UAV, robot, etc.), an LLM type system, a text-to-speech (TTS) or speech-to-text (STT) system, a generative AI system (text, audio, visual or other outputs), a guidance system, a target identification and tracking system, a monitoring and control system, a forecasting model, a personal assistant type application, a consumer product, a computer OS or application (app), and so on.

The system 700 includes a fully trained IGL-ANN 702 that may be realized in hardware, software, firmware or a combination thereof and trained including as described above. The IGL-ANN 702 can be configured to operate responsive to inputs supplied from various sensors 704 as well as other system configuration inputs 706. An output control system 708 may use the outputs of the IGL-ANN 702 to provide various actions as required. A controller 710 provides top level control.

The IGL-ANN can be trained "in-place" (e.g., as part of the overall system 700 using suitable training data) or "pre-trained" and installed in production units. Continuous or subsequent training modes can be enacted, as can periodic updates of parameters in an efficient and effective manner.

CONCLUSION

The various embodiments as presented herein provide a number of benefits over the existing art. A specially configured IGL-ANN section can wholly eliminate the need for backpropagation and other gradient based training approaches. The use of chain isolation optimization techniques allows the effects of parametric adjustments to a single node be quickly evaluated with regard to the effect on the overall loss function of the network.

The specially configured LLO activation function, which may be non-differentiable, provides significant flexibility in modeling various Boolean functions, including difficult to model functions such as XOR, NAND. NOR, etc. as well as analog near-Boolean functions. The elimination of the need for floating gate calculations and precision selection further reduce or eliminate the risk of vanishing gradients and saturation during the training process. It has been found that the various embodiments can provide superior performance to designs of the existing art both in terms of performance (in some cases, many orders of magnitude faster) and cost.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising a computer circuit having a memory in which an Artificial Neural Network (ANN) section is stored, the ANN section comprising a plurality of nodes respectively arranged into an input layer, an output layer, and at least one hidden layer interconnected between the respective input and output layers, each node in the ANN section having multiple inputs, a single output, and a non-differentiable activation function configured to emulate one or more Boolean logic functions responsive to a magnitude of the multiple inputs and at least one weight value, wherein a selected node from the plurality of nodes in the input layer and the at least one hidden layer has the single output thereof connected to a total of one other node in a downstream layer to facilitate training of the at least one weight value of the selected node using a chain isolation optimization process without backpropagation, wherein a total of one active chain path extends through the ANN from the selected node to each node in the output layer, and wherein the chain isolation optimization process comprises adjusting the at least one weight value of the selected node and recalculating output values for each downstream node along the active chain path to determine a change in an output error from the output layer.

2. The apparatus of claim 1, wherein each non-input layer node has a total of two inputs, each of the two inputs connected to a total of one other node in an upstream layer.

3. The apparatus of claim 1, wherein the selected node is a first selected node in a selected layer having an overall population of nodes, wherein the first selected node is randomly selected from among the overall population of nodes for training using a first pass of the chain isolation optimization process to arrive at a first set of adjusted parameters for the first selected node that provides a first reduced output error value, and wherein a different, second selected node in the selected layer is subsequently randomly selected from among the overall population of nodes for training using a second pass of the chain isolation optimization process to arrive at a second set of adjusted parameters for the second node that provides a second reduced output error value lower than the first reduced output error value.

4. The apparatus of claim 3, wherein a subset of selected nodes from the selected layer are sequentially randomly selected for training in turn to provide a final reduced output error value for the ANN section, the subset of selected nodes constituting 5% or less of the overall population of nodes in the selected layer.

5. The apparatus of claim 1, wherein the single output of each node is characterized as Y where Y ranges from a minimum value 0 to a maximum value P where P is a positive integer, and the non-differentiable activation function operates upon a weighted sum (WS) of the multiple inputs and the at least one weight value to generate Y responsive to the following relations:
  if WS is less than zero (0), then Y is zero;
  if WS is between 0 and P, Y is equal to WS;
  if WS is between P and 2P, Y is determined in relation to a difference between WS and P;
  if WS is between 2P and 3P, Y is determined in relation to a difference between WS and 2P; and
  if WS is greater than 3P, Y is equal to P.

6. The apparatus of claim 1, wherein each selected node combines input values from the multiple inputs using weight values for each input value, a bias value and a global precision value P selected in relation to a desired precision between a minimum value and a maximum value to generate a weighted sum (WS), and wherein the non-differentiable activation function operates upon the WS to generate an associated output Y by the selected node where Y is a positive integer value from 0 to P.

7. The apparatus of claim 1, wherein the ANN section further comprises a convolutional filter layer disposed between the input layer and a selected one of the at least one hidden layers.

8. The apparatus of claim 1, wherein the ANN section further comprises a fully interconnected layer (FIL) disposed between the input layer and a selected one of the at least one hidden layers.

9. The apparatus of claim 1, wherein the non-differentiable activation function is configured to model each of the following Boolean logic functions responsive to different magnitudes of the at least one weight value: NOR, XA, XB, AND, NOTB, XOR, B, NOTA, A, NXOR, NAND, OR, NXA, NXB, NULL, and ALL.

10. The apparatus of claim 1, wherein each selected node combines input values from the multiple inputs using weight values for each input value, a bias value and a global precision value selected in relation to a desired precision between a minimum value and a maximum value of the single output for the selected node.

11. The apparatus of claim 10, wherein the desired precision value is characterized as a positive integer P, each of the input values ranges in magnitude from 0 to P, each of the weight values range in magnitude from −2P to +2P, the bias value ranges in magnitude from −1P to +3P, and the output of the selected node ranges in magnitude from 0 to P.

12. The apparatus of claim 1, wherein the chain isolation optimization process comprises identifying a selected node, detecting changes in an output error at an output node coupled to the selected node responsive to each of a different combination of parametric values applied to the selected node, and calculating updated output values for each of a sequence of downstream nodes coupled along a chain path from the selected node to the output node using the output from the selected node and previously stored outputs from other nodes in the ANN section.

13. The apparatus of claim 1, wherein the computer circuit comprises at least one programmable processor, the memory is a computer storage memory utilized by the at least one programmable processor, and the ANN section is realized in software in the computer storage memory.

14. The apparatus of claim 1, wherein the computer circuit comprises one or more application specific integrated circuit (ASIC) devices.

15. A method comprising:
  configuring an Artificial Neural Network (ANN) section as a plurality of nodes respectively arranged into an input layer, an output layer, and at least one hidden layer interconnected between the respective input and output layers, each node in the ANN section having multiple inputs, a single output, and a non-differentiable activation function configured to emulate one or more Boolean logic functions responsive to a magnitude of the multiple inputs and a set of parametric values; and
  training the ANN section using a chain isolation optimization process comprising identifying a selected node, detecting changes in an output error at an output node coupled to the selected node responsive to each of a different combination of the parametric values applied to the selected node, and calculating updated output values for each of a sequence of downstream nodes coupled along a chain path from the selected node to the output node using the output from the selected node and previously stored outputs from other nodes in the ANN section,
  wherein a total of one active chain path extends through the ANN from each selected node to each node in the output layer, and wherein the chain isolation optimization process further comprises adjusting the at least one weight value of the selected node and recalculating output values for each downstream node along the active chain path to determine a change in an output error from the output layer.

16. The method of claim 15, wherein the training step comprises successively applying a batch of training data examples to the input layer and determining an output error from the output layer for each of the training data examples responsive to a difference between a desired output and an actual output, the output error determined using cached values from each of the other nodes in the ANN section.

17. The method of claim 15, wherein the training step further comprises a prior pruning operation upon nodes in the input layer for locations associated with null locations across the training data examples.

18. The method of claim 15, wherein each non-input layer node has a total of two inputs, each of the two inputs connected to a total of one other node in an upstream layer.

19. The method of claim 15, wherein the selected node is a first selected node in a selected layer having an overall population of nodes, wherein the first selected node is randomly selected from among the overall population of nodes for training using a first pass of the chain isolation optimization process to arrive at a first set of adjusted parameters for the first selected node that provides a first reduced output error value, and wherein a different, second selected node in the selected layer is subsequently randomly selected from among the overall population of nodes for training using a second pass of the chain isolation optimization process to arrive at a second set of adjusted parameters for the second node that provides a second reduced output error value lower than the first reduced output error value.

20. The method of claim 15, wherein the non-differentiable activation function has at least one local minimum disposed between an adjacent pair of local maximums.

21. The method of claim 15, wherein each selected node combines input values from the multiple inputs using weight values for each input value, a bias value and a global precision value P selected in relation to a desired precision between a minimum value and a maximum value to generate a weighted sum (WS), and wherein the non-differentiable activation function operates upon the WS to generate an associated output Y by the selected node, where Y is a positive integer in a range of from 0 to P.

22. The method of claim 21, wherein the training step comprises generating an output error value for the ANN section in relation to a difference between a predicted output value and a desired output value using an error forcing function that amplifies the output error value responsive to a magnitude of the difference exceeding a predetermined threshold.

23. The method of claim 15, wherein the set of parametric values for each node are randomized prior to the training step.

24. The method of claim 15, wherein the training step further comprises flagging examples in the test data set that exhibit misclassification error above a selected threshold during a first pass, and advances both occurrence and frequency of the flagged test values during a subsequent second pass.

25. A method comprising:
configuring an Artificial Neural Network (ANN) section as a plurality of nodes respectively arranged into an input layer, an output layer, and at least one hidden layer interconnected between the respective input and output layers, each node in the ANN section having multiple inputs, a single output, and a non-differentiable activation function configured to emulate one or more Boolean logic functions responsive to a magnitude of the multiple inputs and a set of parametric values; and
training the ANN section using a chain isolation optimization process comprising identifying a selected node, detecting changes in an output error at an output node coupled to the selected node responsive to each of a different combination of the parametric values applied to the selected node, and calculating updated output values for each of a sequence of downstream nodes coupled along a chain path from the selected node to the output node using the output from the selected node and previously stored outputs from other nodes in the ANN section;
wherein each selected node combines input values from the multiple inputs using weight values for each input value, a bias value and a global precision value selected in relation to a desired precision between a minimum value and a maximum value to generate a weighted sum (WS), and wherein the non-differentiable activation function operates upon the WS to generate an associated output by the selected node; and
wherein the global precision value is characterized as a positive integer P, each of the input values ranges in magnitude from 0 to P, each of the weight values range in magnitude from −2P to +2P, the bias value ranges in magnitude from −1P to +3P, and the output of the selected node ranges in magnitude from 0 to P.

26. The method of claim 25, wherein the training step comprises generating an output error value for the ANN section in relation to a difference between a predicted output value and a desired output value using an error forcing function that amplifies the output error value responsive to a magnitude of the difference exceeding a predetermined threshold.

27. An apparatus comprising a computer circuit having a memory in which an Artificial Neural Network (ANN) section is stored, the ANN section comprising a plurality of nodes respectively arranged into an input layer, an output layer, and at least one hidden layer interconnected between the respective input and output layers, each node in the ANN section having multiple inputs, a single output, and a non-differentiable activation function configured to emulate one or more Boolean logic functions responsive to a magnitude of the multiple inputs and at least one weight value,
wherein a selected node from the plurality of nodes in the input layer and the at least one hidden layer has the single output thereof connected to a total of one other node in a downstream layer to facilitate training of the at least one weight value of the selected node using a chain isolation optimization process without back-propagation,
wherein the chain isolation optimization process comprises detecting changes in an output error at an output node coupled to the selected node responsive to each of a different combination of parametric values applied to the selected node, and calculating updated output values for each of a sequence of downstream nodes coupled along a chain path from the selected node to the output node using the output from the selected node and previously stored outputs from other nodes in the ANN section,
wherein a total of one active chain path extends through the ANN from the selected node to each node in the output layer, and
wherein the chain isolation optimization process comprises adjusting the at least one weight value of the selected node and recalculating output values for each downstream node along the active chain path to determine a change in an output error from the output layer.

28. The apparatus of claim 27, wherein the ANN section forms a portion of a large language model (LLM), a generative AI system, or an image classification system.

29. The apparatus of claim 27, wherein at least one non-output layer of the ANN section is characterized as a convolutional layer or a fully interconnected layer, and wherein the nodes in all remaining non-output layers in the ANN section each have a single output connected to a single downstream node.

30. The apparatus of claim 27, wherein the computer circuit is characterized as at least one graphical processing unit (GPU) having a plurality of programmable processors that operate in parallel.

* * * * *